United States Patent [19]
Bestgen et al.

[11] Patent Number: 5,699,894
[45] Date of Patent: Dec. 23, 1997

[54] CABLE DRIVEN CONVEYOR SYSTEM

[75] Inventors: Michael J. Bestgen, Green River; Richard B. Kramer, Rock Springs; Daniel P. Moulden, Superior, all of Wyo.; Chris Barbee, Centralia, Wash.; Bryon Hibbetts, Pioria, Ariz.

[73] Assignee: FMC Corporation, Chicago, Ill.

[21] Appl. No.: 539,895

[22] Filed: Oct. 6, 1995

[51] Int. Cl.⁶ .................................................. B65G 17/20
[52] U.S. Cl. .................................. 198/678.1; 198/818
[58] Field of Search ........................... 198/678.1, 686, 198/687, 685, 818, 820, 821, 485.1, 486.1

[56] References Cited

U.S. PATENT DOCUMENTS

| | | | |
|---|---|---|---|
| 3,442,369 | 5/1969 | Harkess | 198/184 |
| 4,792,036 | 12/1988 | Heidelberg | 198/818 X |
| 5,107,983 | 4/1992 | Tschantz | 198/819 |

FOREIGN PATENT DOCUMENTS

| | | | |
|---|---|---|---|
| 0512133 | 7/1952 | Belgium | 198/821 |
| 1195770 | 11/1959 | France | |
| 2215341 | 8/1974 | France | B61B 11/02 |
| 0842026 | 6/1952 | Germany | 198/678.1 |
| 1030249 | 5/1958 | Germany | |
| 1230354 | 12/1966 | Germany | 198/678.1 |
| 2123768 | 11/1971 | Germany | B65G 21/04 |
| 0733714 | 7/1955 | United Kingdom | 198/818 |
| 0797131 | 6/1958 | United Kingdom | 198/820 |

OTHER PUBLICATIONS

*The Way Ahead in Conveying Technology*, Huwood Int'l (not dated).
*Bicable Ropeway*, British Ropeway Engineering Co. Ltd., Kent, England (not dated).
*Cable Belt Introduces the New P.V.L. Conveyor*, Cable Belt Limited, Surrey, England (not dated).
*Rock Products—Special Report:Conveyors*, Maclean Hunter, Chicago Jun. 1993.

Primary Examiner—James R. Bidwell
Attorney, Agent, or Firm—Michael C. Penn

[57] ABSTRACT

There is disclosed a cable driven conveyor system having a plurality of hangers connected to a cable and conveyor belt disposed on the plurality of hangers. The conveyor system is capable of hauling material in more than one direction. The ends of the conveyor system may be easily transportable, allowing for flexibility in the setup of the conveyor system. Their is also shown an idler assembly for use in a cable driven system.

26 Claims, 14 Drawing Sheets

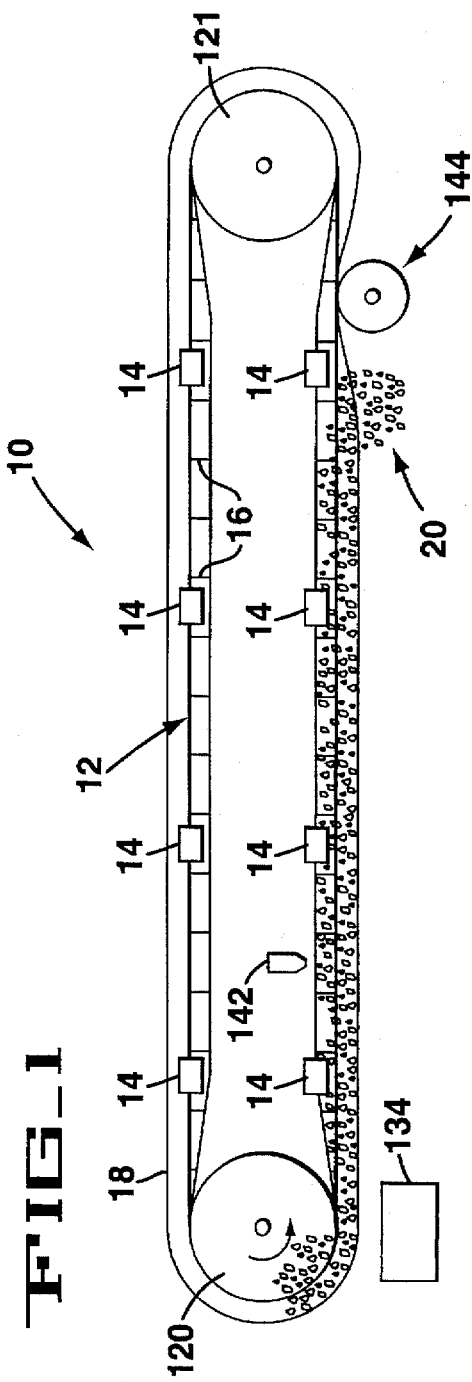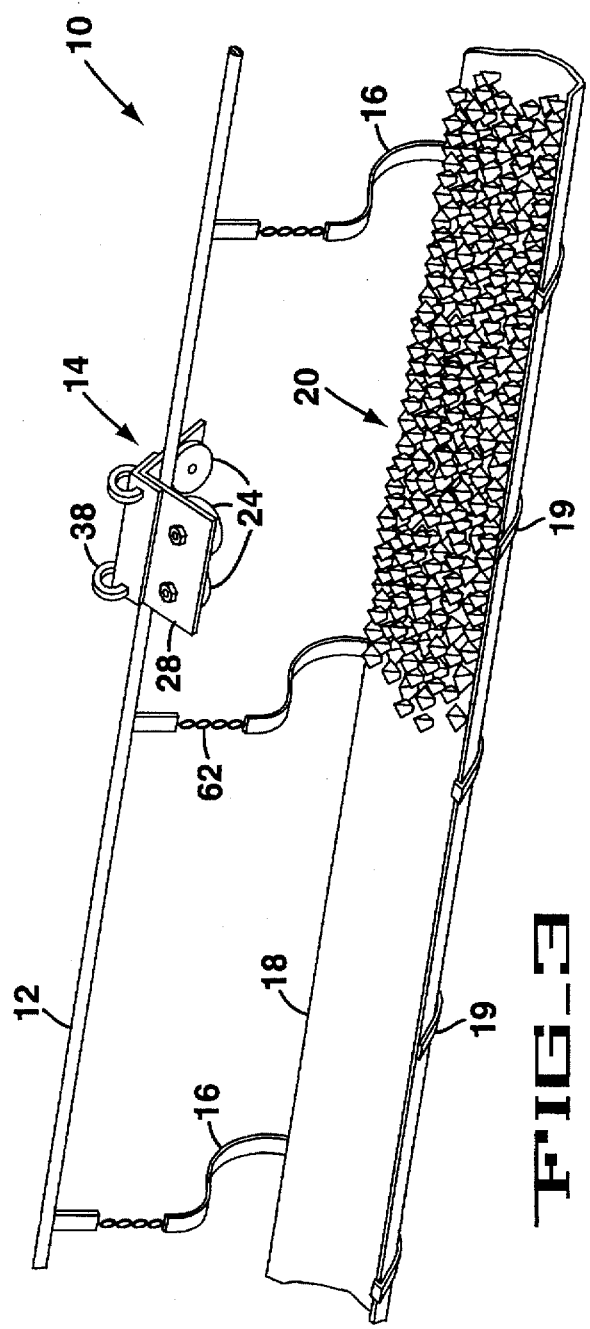

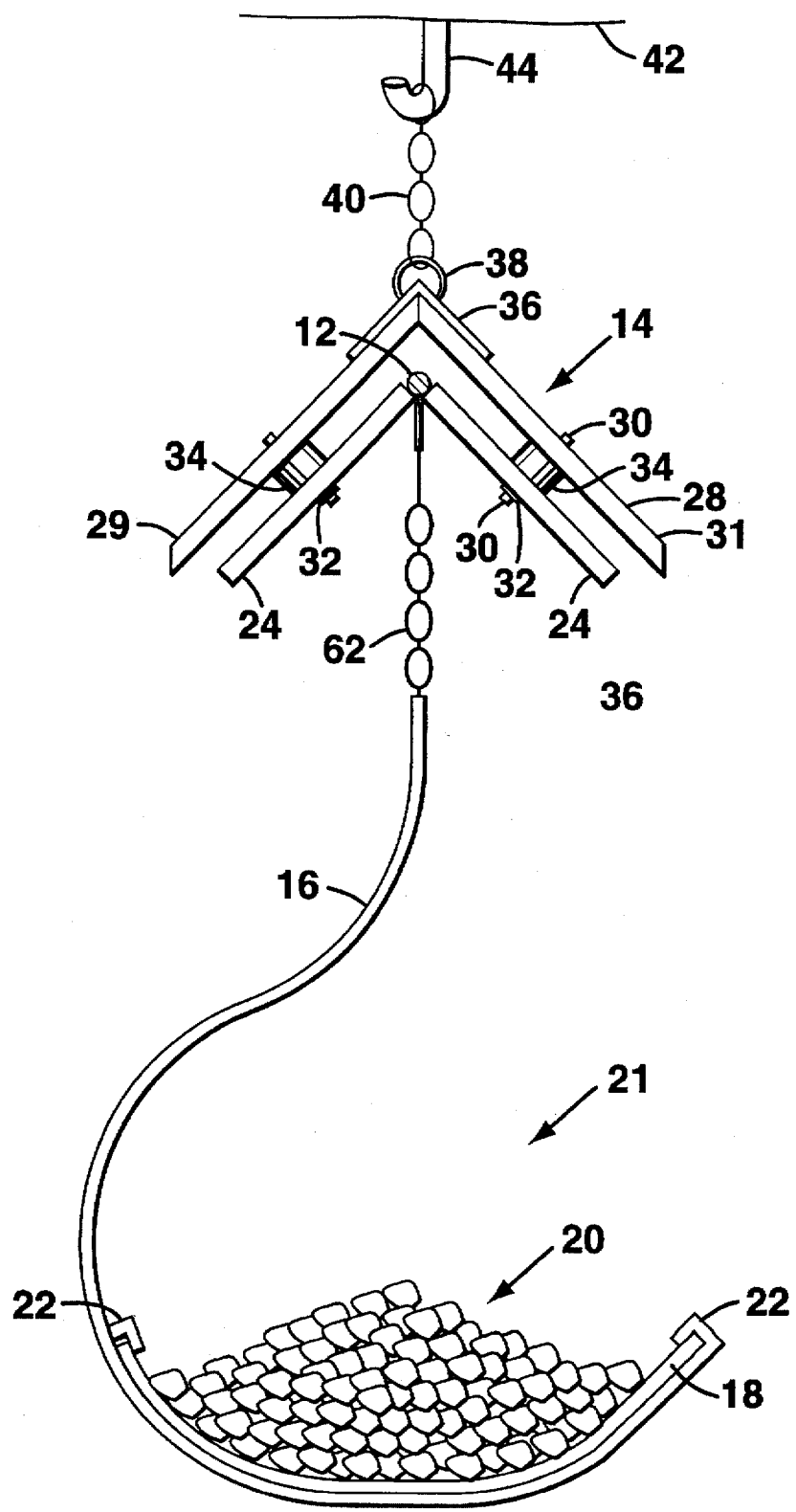
FIG_2

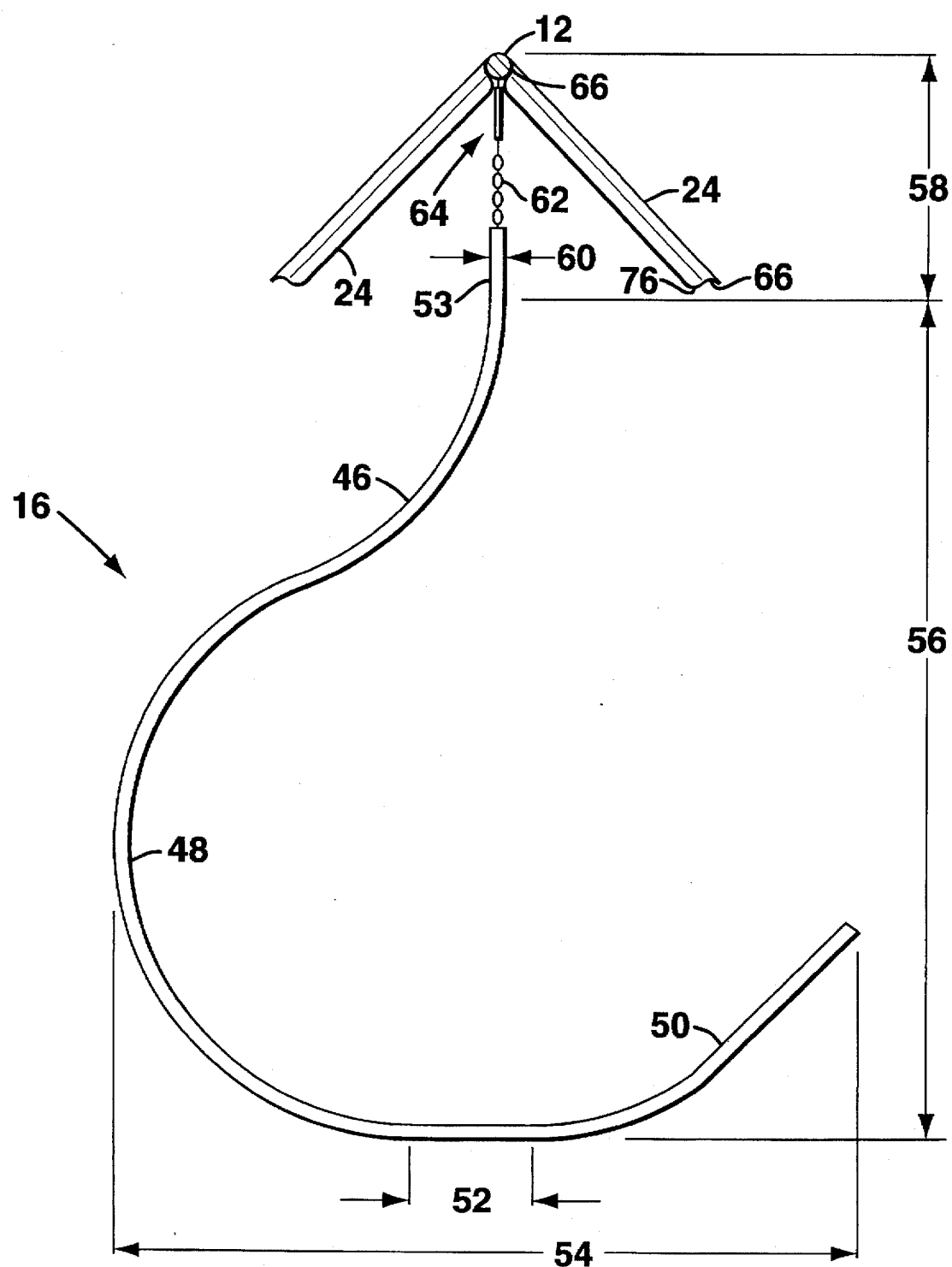
FIG_4

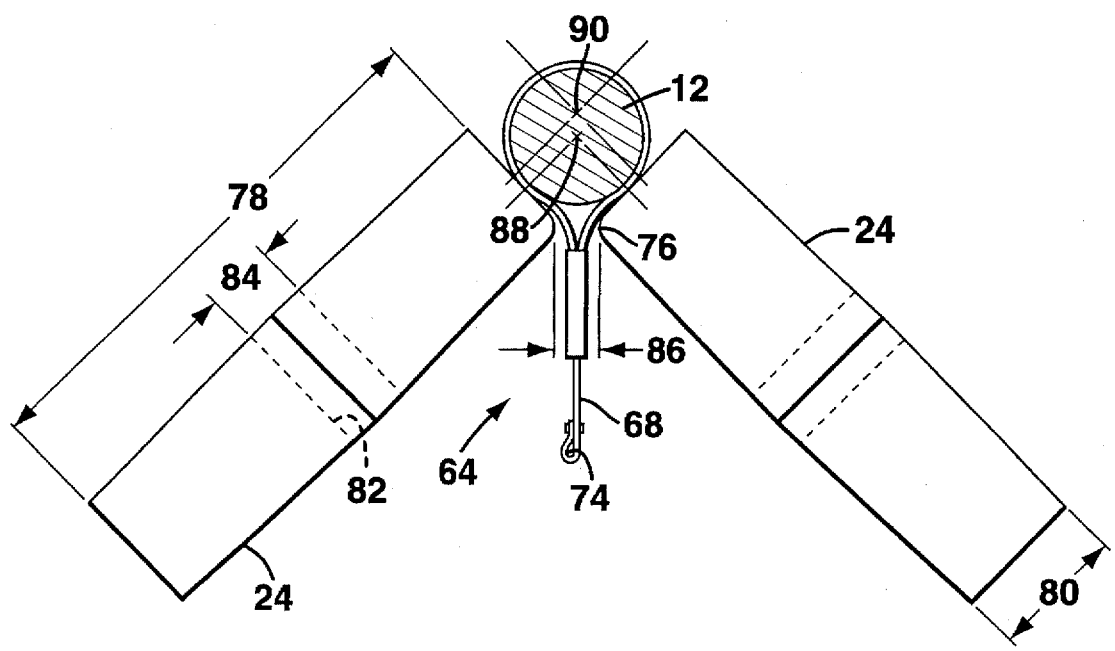
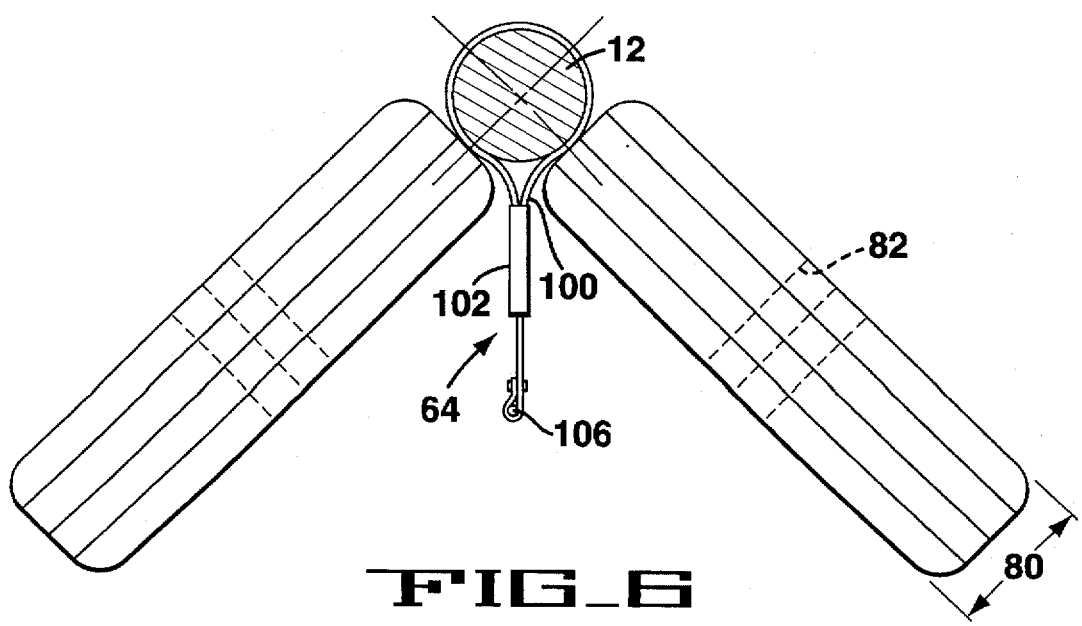

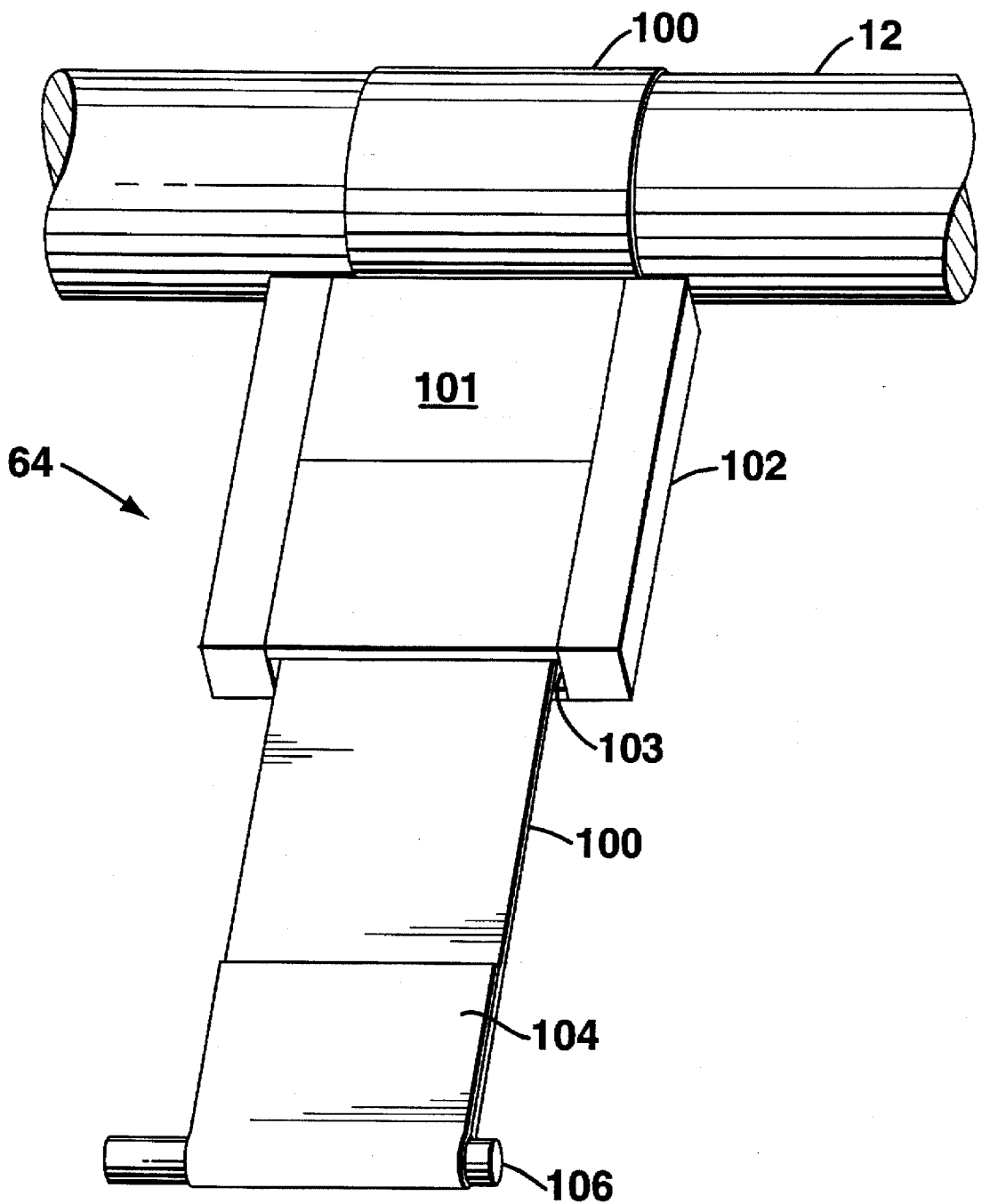
FIG_7

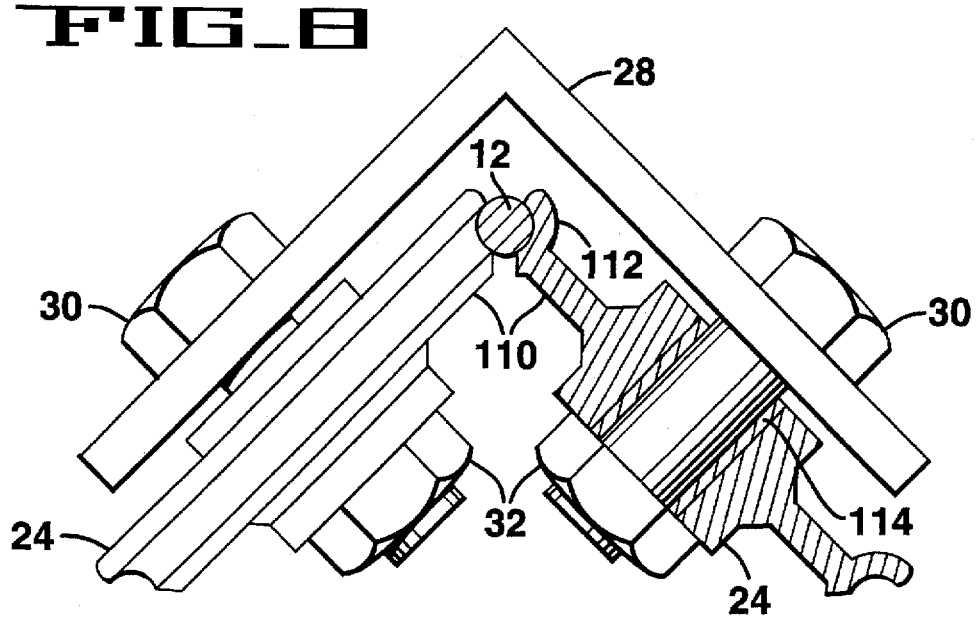
FIG_8
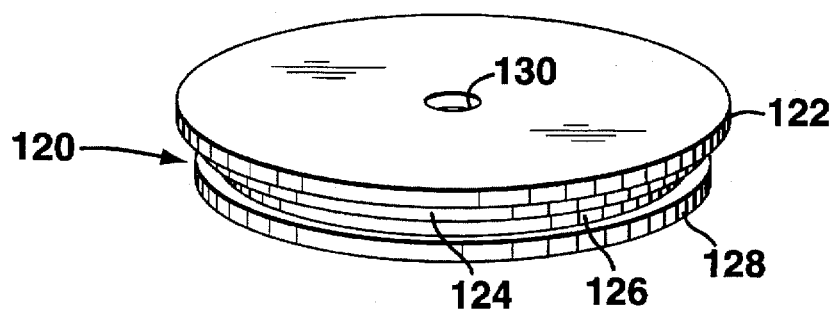
FIG_9
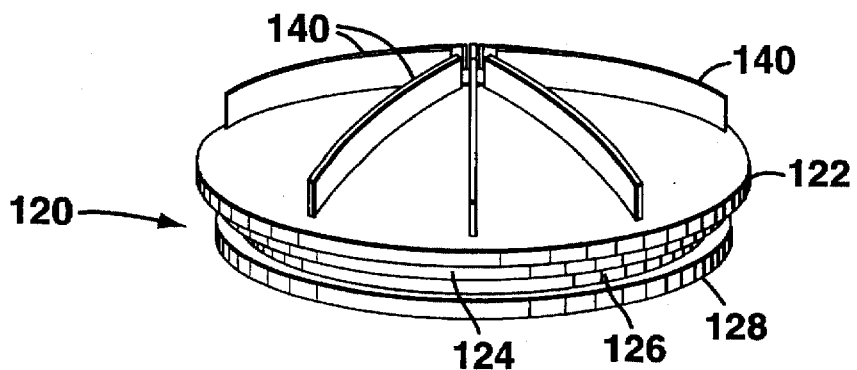
FIG_10

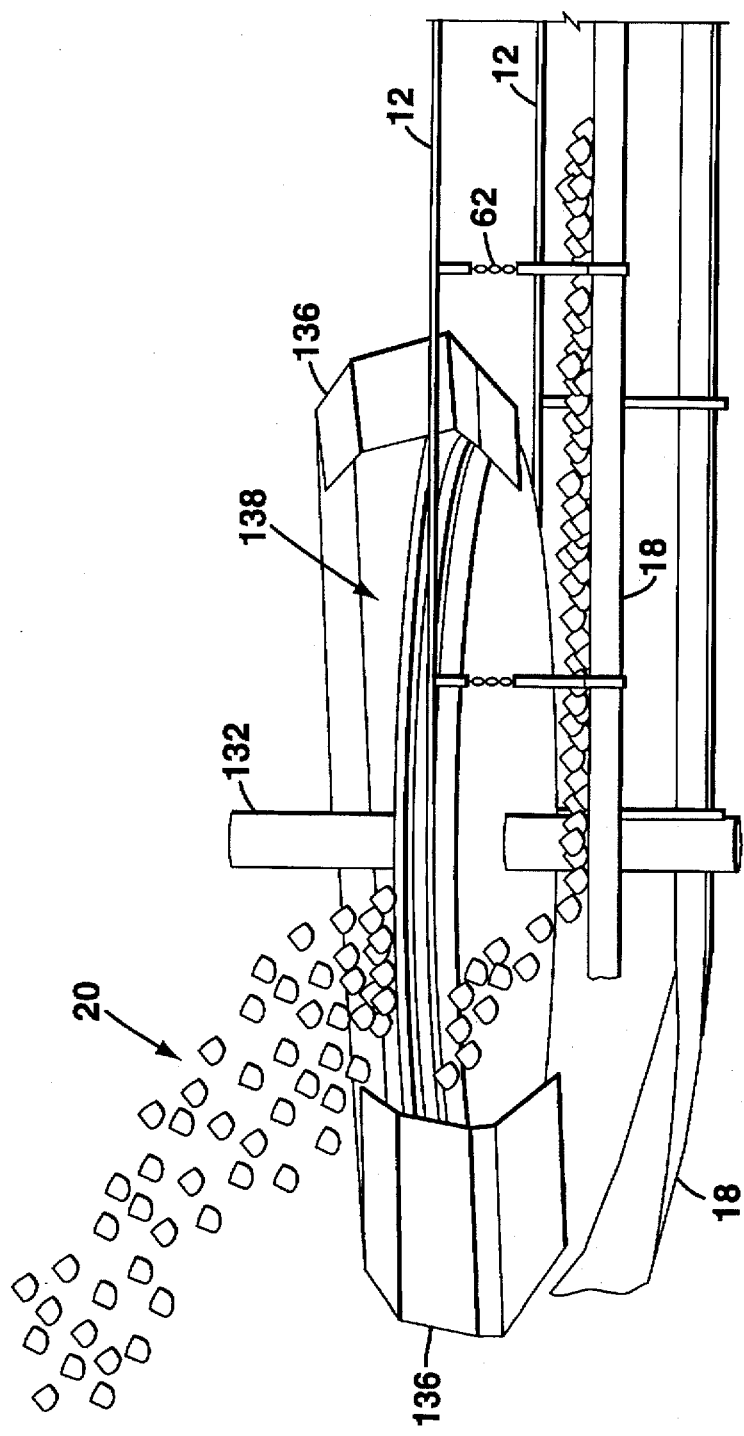
FIG_11
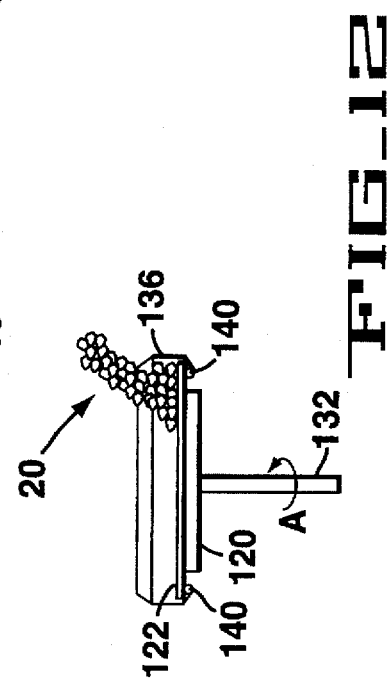
FIG_12

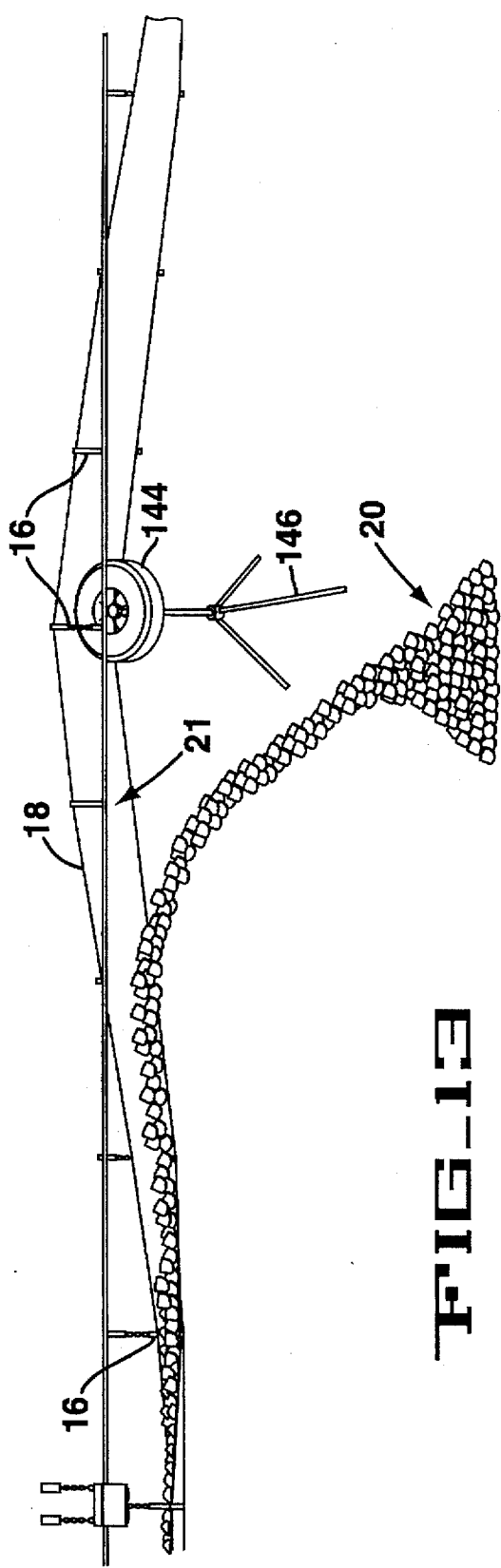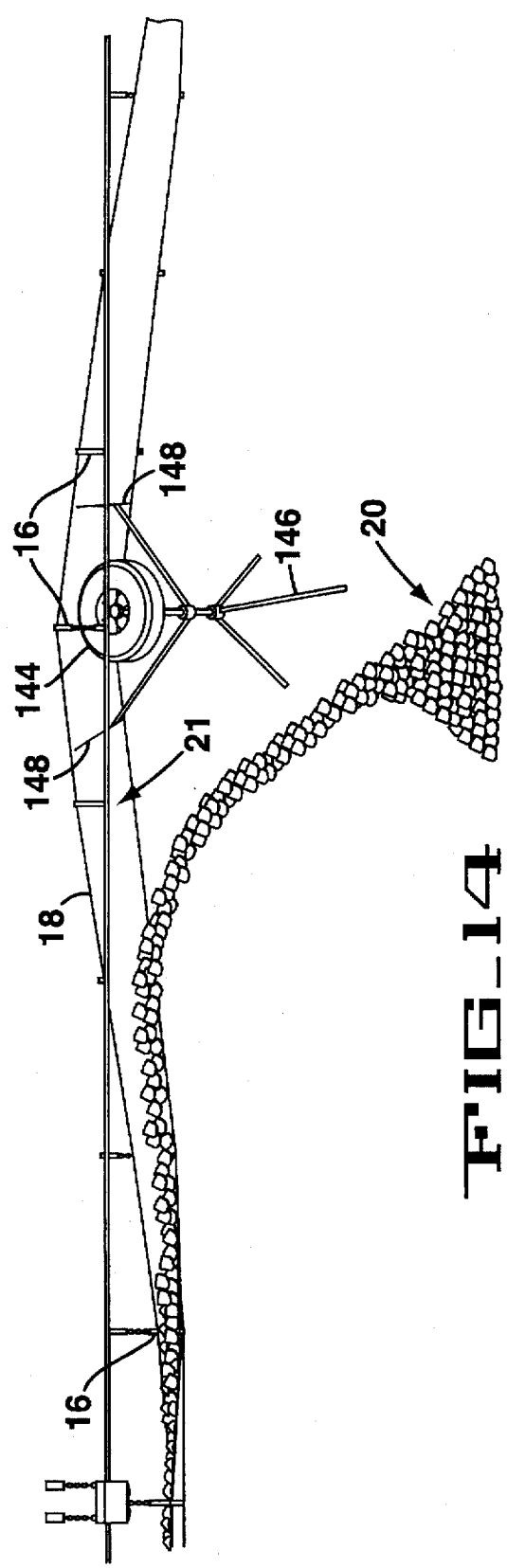

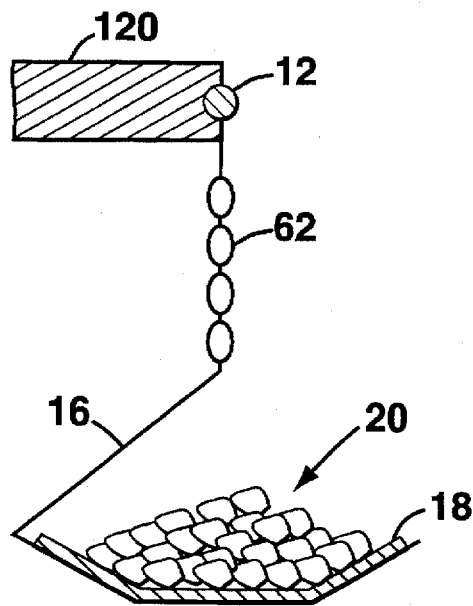
FIG_15A
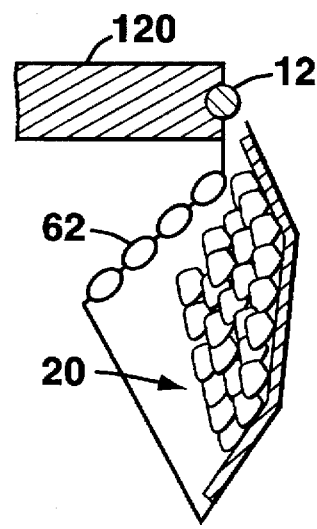
FIG_15B
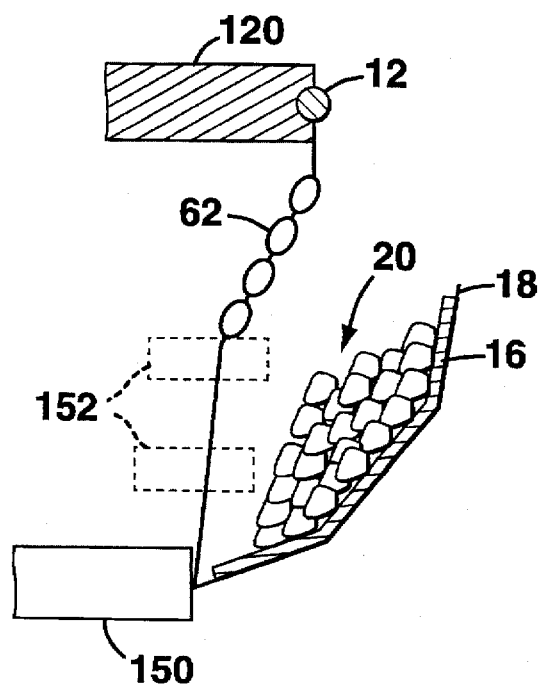
FIG_16

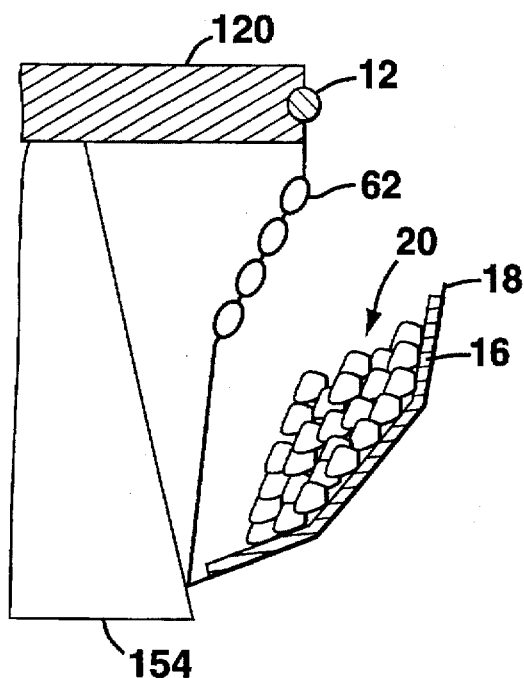
FIG_17
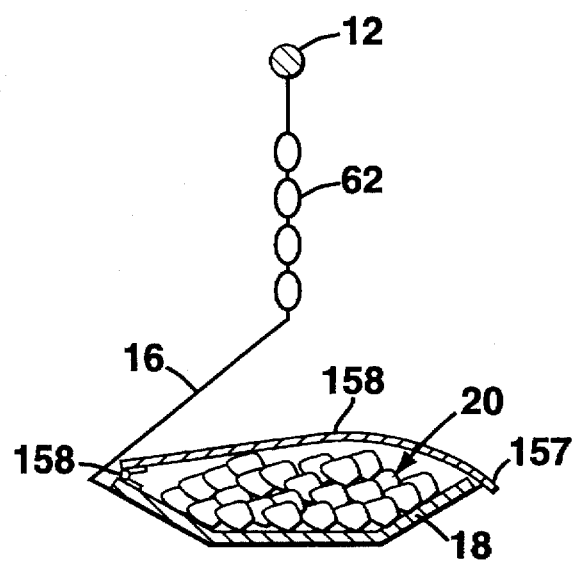
FIG_18A
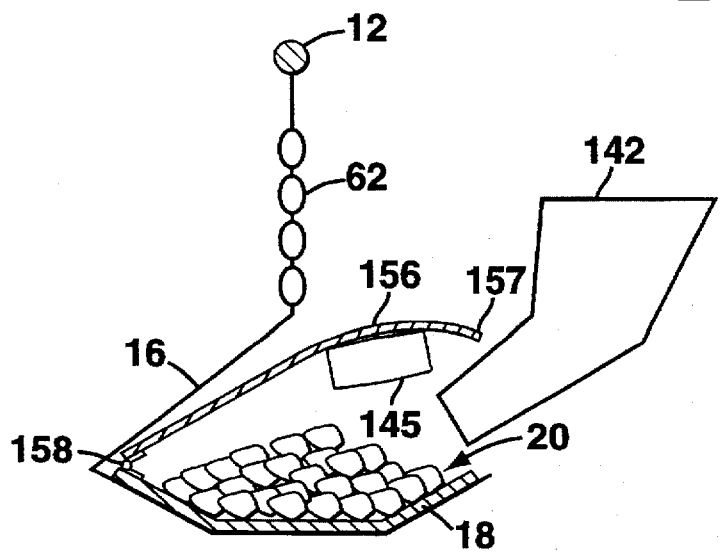
FIG_18B

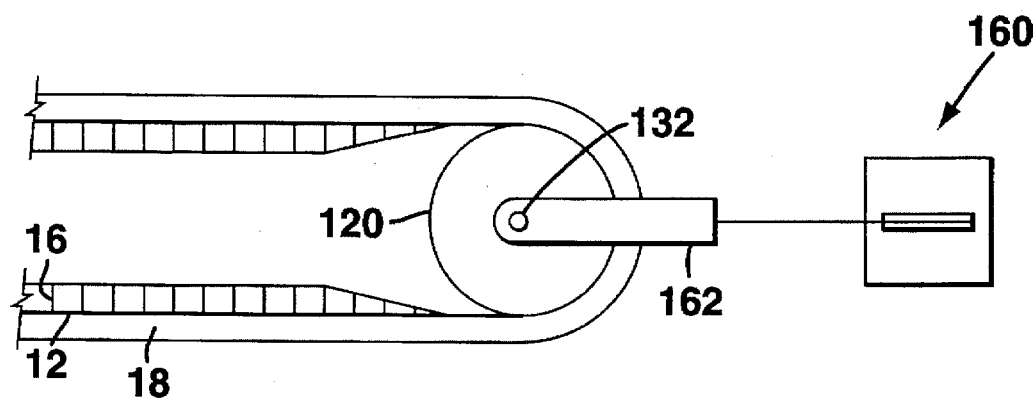
FIG_19A
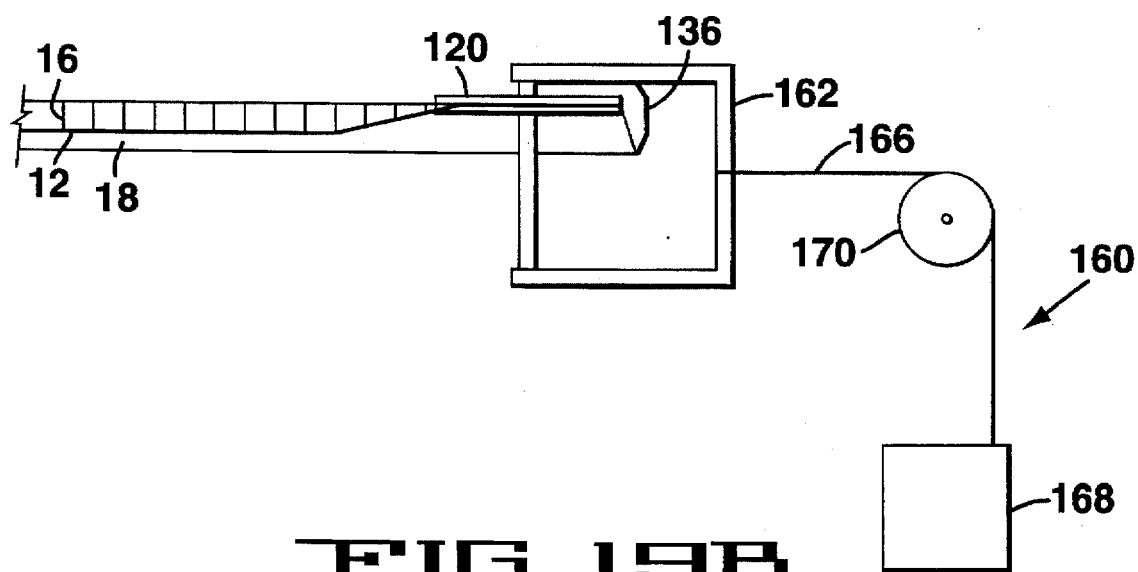
FIG_19B

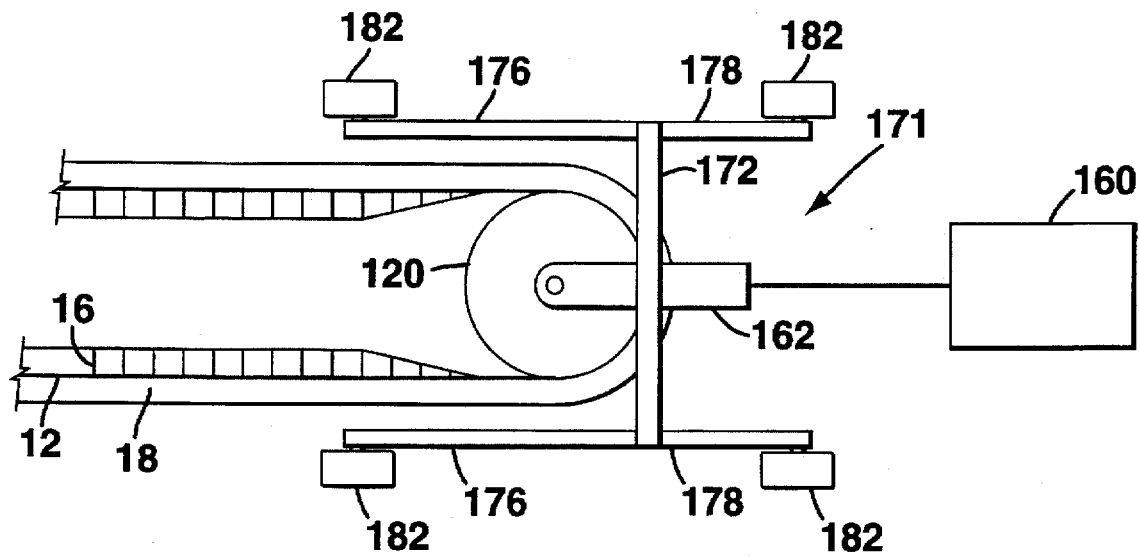
FIG_20A
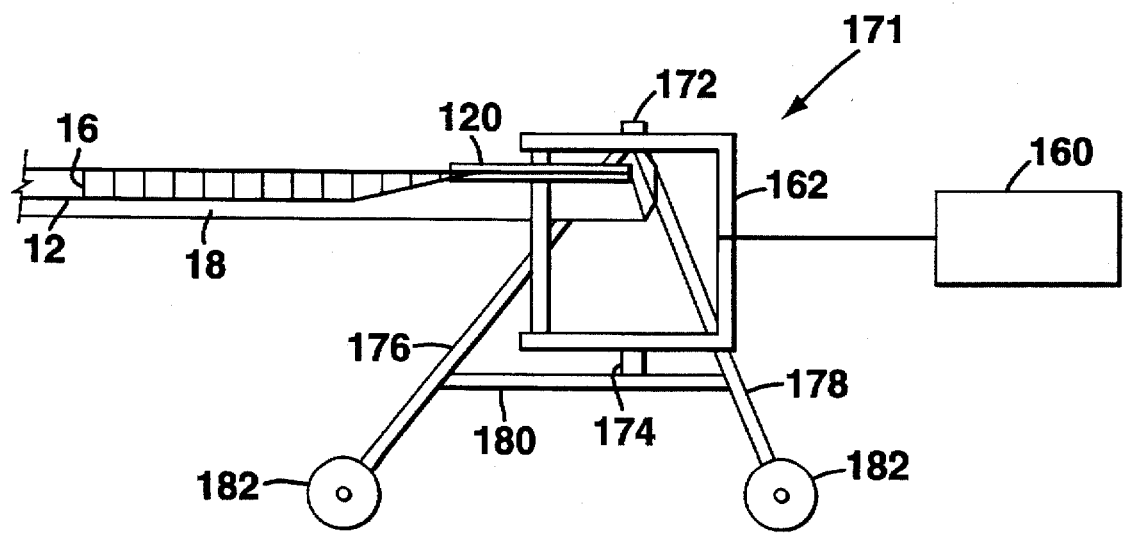
FIG_20B

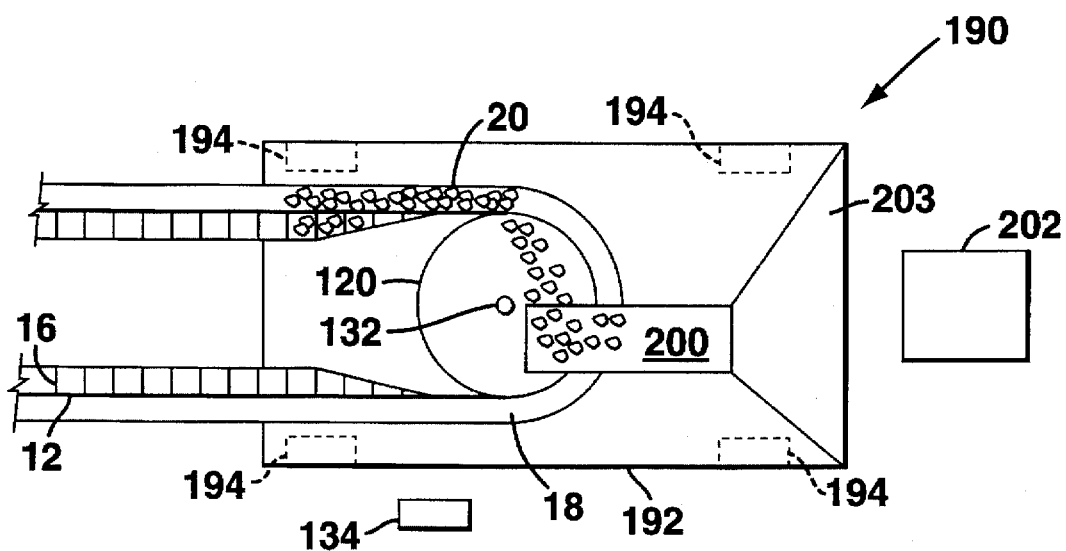
FIG_21A
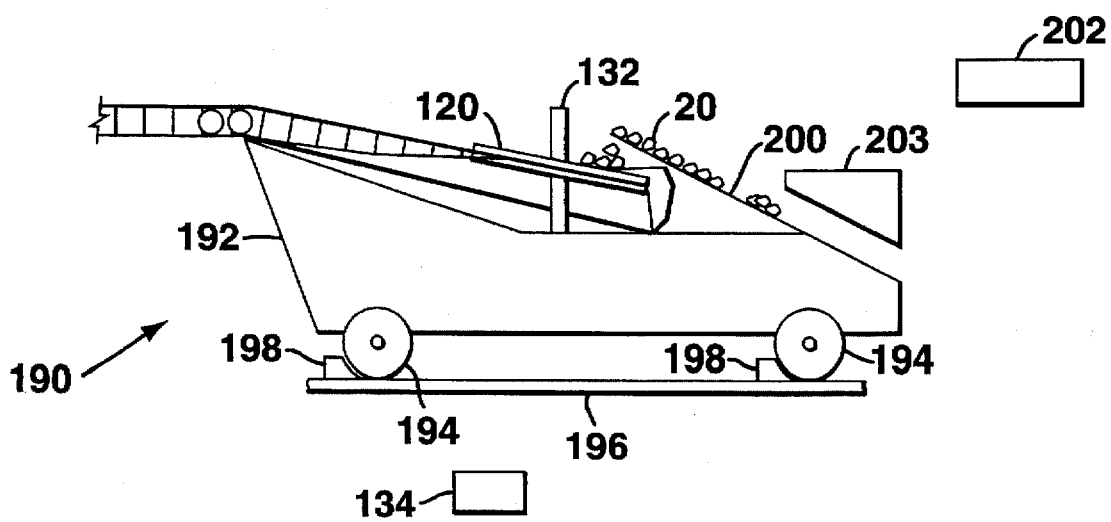
FIG_21B

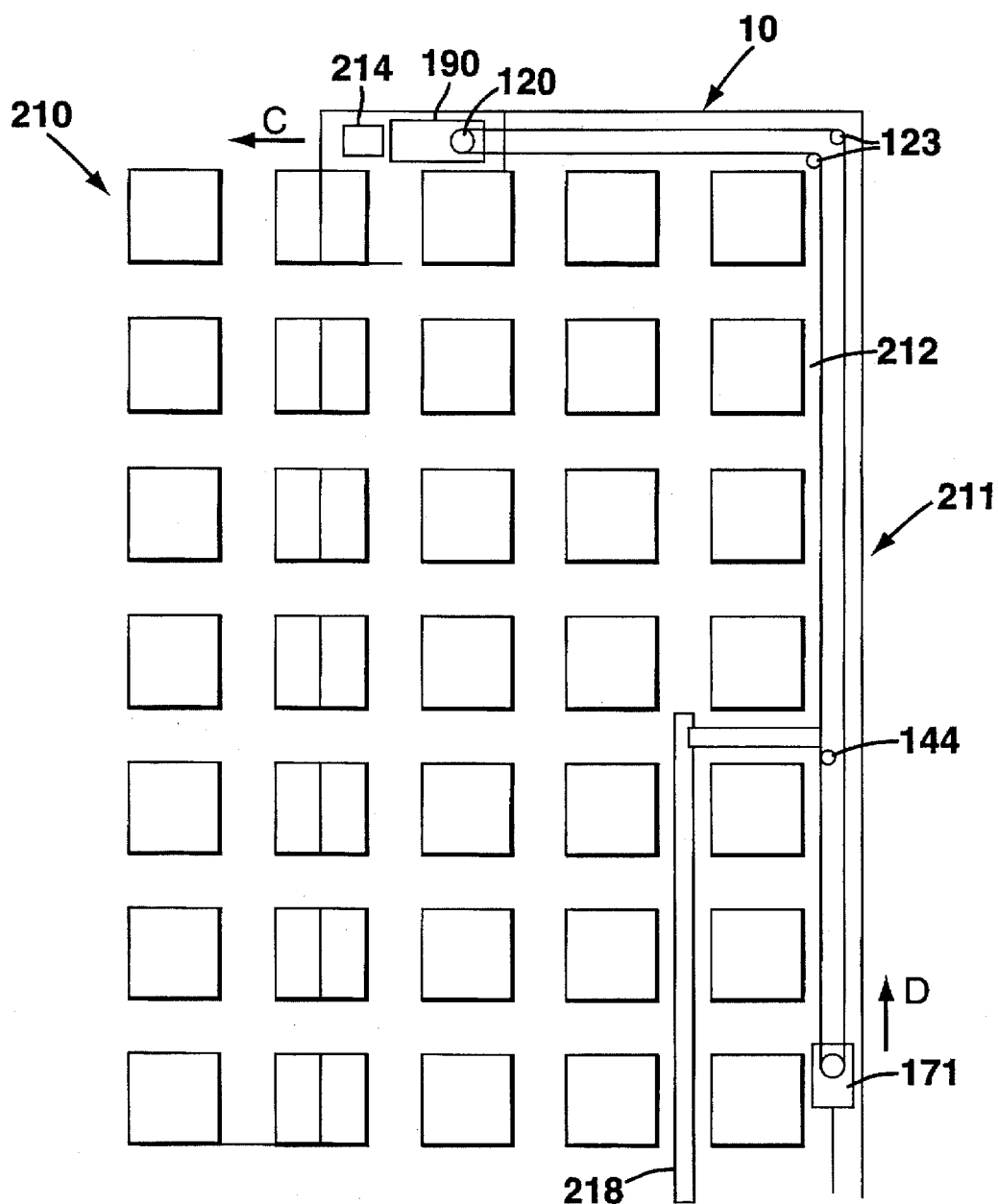
FIG_22
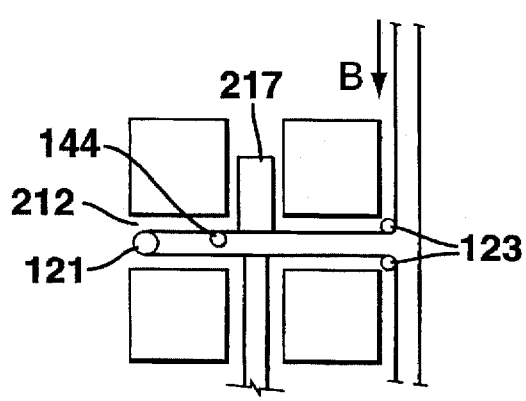
FIG_23

5,699,894

CABLE DRIVEN CONVEYOR SYSTEM

BACKGROUND OF THE INVENTION

1. Field of the Invention

This invention relates to conveyors and more particularly to cable driven conveyors. This invention further relates to an idler assembly for use in a cable driven system.

2. Description of Related Art

Conveyors may be used to transport ore or other materials which have been mined. Such materials may be transported from the miner to a collection site. The distance traveled by the materials may be, for example, in excess of five miles. Because typical prior art conveyors are on the order of one mile in length, it may be necessary to align several conveyors in tandem in order to deliver the mined substances to the collection site.

Because a typical prior art conveying system in a mine may be composed of several conveyors in tandem, it may have, for example, five or more transfer points (i.e., the region between adjacent conveyors). A relatively high amount of dust may collect at a transfer point and this may be unhealthy for persons located in the mine. Further, smaller particles may drop off of the conveyor at the transfer point. As a result, these smaller particles may otherwise have to be manually picked up from time to time. It is therefore desirable to have a conveyor system which has less transfer points.

In addition, typical prior art conveyors have a conveyor belt which is disposed around a series of idler rolls. The conveyor belt is typically looped around the series of idler rolls such that the conveyor belt resting on the idler rolls conveys the material and the conveyor belt disposed below the idler rolls merely provides the return path. As a result, material may only be moved in one direction and thus may not be capable of two way haulage. That is, while the conveyor belt is conveying material, it may not be able to deliver other material in the reverse direction.

Further, in typical prior art conveyor systems used in the mining industry, additional conveyor belt must be added every so often as the mining progresses. It may be rather costly to add additional feet to typical conveyor systems because both the additional conveyor belt as well as a given number of idler rolls must be added to the system. In addition, this may take a relatively large amount of time to set up. It is desirable to have a conveying system that is capable of easily adapting to the conveying needs as the mining progresses.

Moreover, prior art conveyor systems typically have approximately seventy moving parts for every hundred feet of the conveyor system. It is desirable to reduce the number of moving parts in a conveyor system so that it may require less maintenance and may provide better reliability.

SUMMARY OF THE INVENTION

There is provided a conveyor system for transporting material comprising a cable, at least one hanger connected to the cable, and a conveyor belt disposed on the hanger.

There is also provided a conveyor system for transporting material comprising a cable, a plurality of hangers operatively connected to the cable, a conveyor belt disposed on the plurality of hangers, a plurality of idler assemblies supporting the cable, and at least one bull wheel having a notch for receiving the cable, wherein the conveyor is capable of transporting the material in more than one direction.

There is further provided a continuous haulage system for transporting material comprising a cable, a plurality of hangers operatively connected to the cable, a conveyor belt disposed on the plurality of hangers, a plurality of idler assemblies supporting the cable, and a continuous haulage assembly, the continuous haulage assembly comprising a bull wheel disposed on a shuttle car, the bull wheel having a notch for receiving the cable, the continuous haulage assembly being movable.

There is further provided an idler assembly for use in a cable driven system comprising an idler bracket, a first idler wheel connected to the idler bracket, a second idler wheel connected to the idler bracket, the first and second idler wheels forming a pair of idler wheels and being arranged in an angular relation forming a cradling region, wherein the cradling region supports a cable of the cable driven system.

BRIEF DESCRIPTION OF THE DRAWINGS

FIG. 1 is a plan view of a cable driven conveyor system in accordance with the principles of the present invention.

FIG. 2 is an end view of the idler assembly, hanger, and conveyor belt.

FIG. 3 is a perspective view of the cable driven conveyor system of the present invention.

FIG. 4 is a sectional end view of the hanger and idler wheels.

FIG. 5 is a sectional end view of the idler wheels and cable connection.

FIG. 6 is a sectional end view of an alternate embodiment of the idler wheels and cable connecting assembly.

FIG. 7 is a perspective view of the cable connecting assembly of FIG. 6.

FIG. 8 is a sectional end view of an alternate embodiment of the idler wheels.

FIG. 9 is a perspective view of a bull wheel and steel plate cover.

FIG. 10 is a perspective view of an alternate embodiment of the bull wheel and steel plate cover.

FIG. 11 is a perspective view of the bull wheel, shroud, and conveyor belt.

FIG. 12 is a cross sectional view of the bull wheel and shroud.

FIG. 13 is a perspective view of an idler roll cooperating with the conveyor belt for dumping purposes.

FIG. 14 is a perspective view of an idler roll and scrapers cooperating with the conveyor belt for dumping and cleaning purposes.

FIG. 15A is a sectional end view of a hanger in its stationary position. FIG. 15B is a sectional end view of a hanger in its running position and turning about the bull wheel.

FIG. 16 is a sectional end view of a wheel or series of wheels for providing a smoother transition between the stationary and running positions for hangers disposed near the bull wheel.

FIG. 17 is a sectional end view of an alternate embodiment employing a concentric bell flange for providing a smoother transition between the stationary and running positions for hangers disposed near the bull wheel.

FIG. 18A is a sectional end view of an alternate embodiment of a hanger further including a flap in its closed position. FIG. 18B is a sectional end view of the hanger with the flap in its closed position and further showing a hopper and roller wheel.

FIG. 19A is a plan view of tensioning system used in conjunction with the bull wheel. FIG. 19B is a cross sectional view of the tensioning system of FIG. 19A.

FIG. 20A is a plan view of a transportable bull wheel assembly. FIG. 20B is a cross sectional view of the transportable driven bull wheel assembly of FIG. 20A.

FIG. 21A is a plan view of a continuous haulage assembly, drive, and crusher. FIG. 21B is a cross sectional view of the continuous haulage assembly, drive, and crusher of FIG. 21A.

FIG. 22 is a schematic view of the cable driven conveyor system used in conjunction with conventional conveyor systems.

FIG. 23 is a partial schematic view of an alternate embodiment of the cable driven conveyor system.

DESCRIPTION OF THE PREFERRED EMBODIMENTS

Referring to FIG. 1, there is shown a cable driven conveyor system 10 of the present invention. Referring also to FIGS. 2 and 3, the cable driven conveyor system 10 may comprise a cable 12, a plurality of idler assemblies 14, a plurality of hangers 16, and a conveyor belt 18 disposed on the hangers 16. The conveyor belt 18 may transport, for example, ore or other particles 20. Although the term cable 12 will be used, this term encompasses a rope, chain, or other similar means to support the hangers 16.

The hanger 16 defines an opening 21 so that particles 20 may be placed or removed from the conveyor belt 18 disposed on the hanger. Preferably, the hangers 16 are formed of spring steel. The hangers 16 may also be formed of steel tubing or structural steel. The conveyor belt 18 may, for example, rest directly on the hanger 16 not being directly fixed to the hanger. As a result, the conveyor belt 18 will be free to move and spread out its wear over the length of the conveyor belt and not isolate the wear to any fixed connecting point. Alternatively, the conveyor belt 18 may be secured to the hanger via standard belt clips, not shown. The belt clips may be placed on the under side of the conveyor belt 18 and may be bent to conform to the contour of the hanger for securing the conveyor belt 18.

The hanger 16 may further include tabs 22 which may wrap over the edge of the conveyor belt 18. The tabs 22 may be attached to or may be an integral part of the hanger 16. By attaching the conveyor belt 18 to the tabs 22 rather than to the bottom of the hanger 16, the central region of the conveyor belt 18 would be somewhat free to move relative to the bottom of the hanger 16. As a result, this may eliminate premature wearing of the conveyor belt 18.

Preferably, the hangers 16 are spaced relative to one another in order to help prevent the conveyor belt 18 from flattening in shape (i.e., in order to maintain the trough shape of the conveyor belt 18). The hangers 16 may, for example, be spaced every three feet. Alternatively, the conveyor belt 18 may have a support 19 mounted directly on the underside of the conveyor belt 18. The support 19 would be of a shape similar to that portion of the hanger 16 being exposed to the conveyor belt 18. The supports 19 may, for example, be placed every six feet. Further, the hangers 16 would be placed in a region approximately half way between adjacent supports 19. As a result, hangers 16 could be spaced every six feet as well which may further reduce the costs associated with the cable driven conveyor system. 10. As with the hangers 16, the support 19 may be appropriately secured to the conveyor belt 18 via belt clips similar in construction to the belt clips used to secure the conveyor belt 18 to the hangar 16. Alternatively, the hangers 16 and supports 19 may be molded into the rubber portion forming the conveyor belt 18.

The idler assembly 14 comprises idler wheels 24. Preferably, there are four idler wheels 24 arranged in pairs of first and second idler wheels. The first and second idler wheels are arranged in an angular relation forming a cradling region 26. The cradling region 26 supports the cable 12. Preferably, the first and second idler wheels 24 form approximately a ninety degree angle. Because the idler wheels 24 are disposed below the cable 12, the hangers 16 supporting the conveyor belt 18 may be better able to travel around corners. The idler wheels 24 are preferably formed of steel or polyurethane. Although the idler assembly 14 preferably has four idler wheels 24, the idler assembly may have two or more idler wheels 24.

The idler assembly 14 further comprises an idler bracket 28. The idler bracket 28 has a first side 29 and second side 31 and an angle in between the first and second side forming a v-shape, the angle being similar to the angular relation of the idler wheels 24, that is, ninety degrees. The idler bracket 28 may be formed of a continuous piece of steel or from angle iron. Alternatively, the idler bracket 28 may be formed of two pieces of steel which are welded together at the seam. Where, for example, there are four idler wheels 24 (i.e., two wheels on each side of the cable 12) for a given idler assembly 14 and each of the wheels is eight inches in diameter, the idler bracket 28 may be one-half an inch in thickness and may have a cross section of eight inches by twenty four inches on each side of the cable 12, the twenty four inch dimension running parallel to the direction of cable 12. However, the dimensions of the idler bracket 28 may be altered depending upon the idler wheel 24 size selected.

Bearings 34 are disposed between the idler wheels 24 and the idler bracket 28. The bearings 34 may be tapered roller bearings, roller bearings, ball bearings, barreled bearings, or bushings. Preferably, the bearings are tapered roller bearings manufactured by Timken Co. of Canton, Ohio. The idler wheel's axle shaft 30 is disposed in the bearing 34. Further, standard grease zerks 32 surround the axle shaft so that grease can be added to the bearings periodically.

A second bracket 36 may be welded to the idler bracket 28 for additional support. The second bracket 36 may also be formed of a continuous piece of steel or may be formed of two pieces of steel which are welded together at the seam. The second bracket 36 may be, for example, twenty four inches in length, one half inch in thickness, and may extend eight inches from the center fold of the bracket 36. The second bracket 36 may be formed, for example, from an eight inch angle iron. Rings 38 may be welded or otherwise secured to the bracket 36. Preferably, there are two rings 38 for a given idler assembly 14. The rings 38 may be sized to receive a chain 40. The chain 40 may, in turn, be bolted, for example, to the roof of a mine 42 by the use of a rock bolt 44. The rock bolt 44 may be a ⅝ inch, ¾ inch, or ⅞ inch rock bolt as is typically used in the mining industry. Although the idler assembly 14 has been discussed for mining applications, the idler assembly 14 may be used in conjunction with any cable driven system, such as ski lifts, or other haulage of persons or material.

Referring to FIG. 4 as well, there is shown a preferred embodiment of the hanger 16. The hanger 16 is preferably formed of a single piece of spring steel. However, the hanger 16 may also be formed of stainless steel tubing provided that the steel tubing may handle the stresses required to form the bended hanger 16. The hanger 16 has a first bend 46, a second bend 48, and a third bend 50. Preferably the radius of curvature for each of the bends 46, 48, and 50 is the same. The bottom portion 52 is preferably generally flat in dimension. Further, the top portion 53 is generally flat in dimension.

The hanger 16 may, for example, have a radius of curvature of six inches for the bends 46, 48, and 50. Further, the bottom portion 52 may be three and one-sixteenths of an inch. The hanger 16 may have a width 54 of fifteen and five-sixteenths of an inch. The dimension 56 from the beginning of the first bend 46 to the bottom portion 52 may be sixteen and three-fourths of an inch. The top portion 53 of the hanger 16 may be two inches. The thickness 60 of the hanger may be a quarter of an inch. Further, the length of the hanger (i.e., the dimension of the hanger perpendicular the figure) may be two inches.

The dimension 58 from the beginning of the first bend 46 to the top of the cable 12 may be twelve to twenty inches and may preferably be seventeen and one-fourth of an inch in length. Included within the dimension 58 is the top portion 53, a chain 62, and a cable connecting assembly 64. When a six foot diameter bull wheel 120 is used, preferably, the chain 62 is one foot in length. This helps to compensate for the difference in the length of the cable 12 in comparison to the conveyor belt 18 traveling about the bull wheel. Specifically, when the bull wheel 120 is six feet in diameter and the conveyor belt 18 is hung approximately two and a half feet below the cable 12, the conveyor belt 18 path is approximately three feet shorter than the cable 12 path. The one foot chain 62 compensates for this difference in distance traveled and allows the conveyor belt 18 to travel freely and make a smoother transition around the corner of the bull wheel 120. Preferably, the chain 62 is one quarter of an inch in thickness.

Referring also to FIG. 5, there is shown a cable connecting assembly 64. The cable connecting assembly 64 includes a rope 68 which is disposed around the cable 12. The rope 68 may be, for example, a nylon rope having a diameter of two inches. The cable connecting assembly 64 also includes a bracket 70 may be similar to the choker assemblies commonly used in the mining industry or may be similar to bracket 102 of FIG. 7 to be described in further detail. One end of the rope 68 is fastened to the bracket 70. The second end of the rope 68 is disposed through a bore, not shown, in the bracket 70, thus being connected to the cable 12 in a slip knot fashion. The second end of the rope 68 is fastened onto itself forming a hole 74. The second end may be fastened onto itself by the use of rivets or a small screw and nut assembly. Where the rope 68 is a metal cable, the second end may be fastened onto itself by welding. The chain 62 may then be appropriately fastened to the rope 68 via hole 74.

The idler wheels 24 should be configured such that they do not interfere with the rope 68. As an example, the idler wheels 24 may have a diameter of eight inches and a thickness 80 of two inches. Further, the idler wheels 24 may have a bore 84 with a diameter of one inch for receiving the axle shaft 30. The idler wheels 24 may be supporting a cable 12 having a diameter of two inches. Preferably, there is a distance 86 which is nine sixteenths of an inch between the adjacent idler wheels 24. Further, preferably the idler wheels 24 have a curved portion 76 to help ensure that the idler wheels 24 do not interfere with the operation of the rope 68. The idler wheels 24 may, for example, have a wheel capacity of 1260 lbs per wheel.

Because the center 88 of the cable 12 is slightly below the center 90 of where the axis of each of the idler wheels join (approximately one-fifth of an inch in the example provided), most of the load due to the cable on the idler wheels is on the lower half of the idler wheels. Therefore, it is not necessary that the upper part of the idler wheel track the shape of the cable 12. However, as shown in FIG. 4, the idler wheels 24 may contain curved ends 66 which are generally formed to engage as much of the surface of the cable 12. This may aid in lowering the impingement stresses and therefore may reduce wear on either the cable 12 or idler wheels 24.

Referring to FIGS. 6 and 7, there is shown an alternate embodiment of a cable connecting assembly 64. The cable connecting assembly 64 comprises a spring steel strap 100 and a steel bracket 102. The spring steel strap 100 may, for example be one-one hundredths of an inch in thickness. One end of the spring steel strap 100 may be fastened to the bracket 102 by the use of welding in region 101. The strap 100 may, for example, be welded to the exterior of bracket 102. Alternatively, that end of the spring steel strap 100 may be fastened to the bracket 102 by rivets, not shown.

The bracket has a long narrow slit 103 configured to receive a second end of the strap 100. The narrow slit if free to allow some slip in the strap 100 and functions as a choking mechanism for restricting the strap 100 as much as possible to help reduce fatigue on the strap. That is, the bracket 102 keeps the strap as close to the cable as possible and helps to minimize the impact on the on the strap as it passes through the idler assemblies 14. The spring steel strap wraps around cable 12 as best shown in FIG. 7. The other end of the spring steel strap 100 may be disposed through the bracket in a slip knot fashion through the bracket 102.

The second end of the spring steel strap 100 may wrap around itself as shown by overlap portion 104 wherein the overlapping sheets of spring steel are secured to one another by either welding the strap onto itself or by the use of rivets, forming a bore for receiving a clevis pin 106. When welding techniques are employed, the overlap portion 104 may be, for example, one inch. When rivets are employed, the overlap portion 104 may be, for example, two inches. A standard clevis pin 106 having a throat wider than the strap 100 may be used to attach the strap 100 to the chain 62. The end loop of the chain 62 may be slipped through the clevis 106 before connecting the chain 62 and the strap 100 with the clevis.

Bracket 102 is preferably a rectangular block of steel with a slit 102 through its center and a ribbon of strap metal 100 that will function in a manner similar to a choker mechanism with a cable. The bracket 102 may, for example, be three inches in width, two-and-a-half inches in length, and a quarter-of-an-inch in thickness. Further, the slit 103 is preferably disposed in a central location of the bracket 102 and has a cross section of two inches in width and one-sixteenths-of-an-inch in height. One side of strap 100 will be attached at welding region 101. The other side the strap 100 will wrap around the cable 12 and pass back down through the slit 103, thus forming a choking mechanism. This other side or end of the strap 100 will be fashioned so that it can accept a clevis pin 106 so that a chain 62 can be attached thereto.

The cable connecting assembly 64 may surround the cable 12. The diameter of the cable 12 may be, for example, one half an inch or three quarters of an inch in diameter. Further, the idler wheels may have, for example, a six inch diameter, a thickness 80 of one inch and a bore 82 of one inch.

Referring now to FIG. 8, there is shown an alternate embodiment of the idler wheels. In this embodiment, a steel idler wheel 24 is employed having arms 110 and hands 112 which embrace the cable 12. The wheels further contain a bushing, roller or tapered roller bearings 114 for reducing rolling resistance and component wear. The wheel 24 may be, for example a six inch diameter sheave wheel manufactured by the Crosby Company of Tulsa, Okla. The bottom radius of the rim of the sheave wheel may be trimmed at a distance to allow suitable clearance for the straps 100. The top radius may also be trimmed in a similar fashion although this is not necessary. Further, the distance 86 between the idler wheels may be a quarter of an inch. The idler bracket 28 may for example be one-half an inch in thickness, and each of the legs forming the idler bracket may form a ninety degree angle and may be six inches by twenty four inches, the twenty four inch dimension being parallel to the cable 12.

Suspending the loaded conveyor between idler assemblies 14 may require about four tons of tension. As a result, where a steel cable or rope 12 is used, the diameter of the cable may be one-half an inch in diameter where the construction of such a cable has a breaking strength in the order of ten to fifteen tons. Larger diameter cables may be required for high volume transporting systems where more tension may be required to limit the sag between idler assemblies 14. Nylon ropes or manila ropes may also be chosen for supporting the hangers 16; however, the diameters required for supporting a four ton tension would be larger than a corresponding steel cable.

Now referring to FIGS. 1, 9, and 11, there is shown a bull wheel 120 and a steel plate cover 122. The bull wheel 120 has a first cylindrical member 124, a second cylindrical member 126, and a third cylindrical member 128. Each of the cylindrical members 124, 126, 128 as well as the steel plate cover 122 contain a bore 130 for receiving a shaft 132. The bull wheel 120 is rotated by a drive, to be described.

A second bull wheel 121, similar in construction to bull wheel 120, may be driven by the bull wheel 120 via cable 12. The material 20 may be loaded onto the driven bull wheel 121 in a similar fashion as to the driving bull wheel 120. The only difference between the driving bull wheel 120 and the driven bull wheel 121 is the fact that a drive shaft which is concentric with the shaft 132 would be welded to the bull wheel 120 and would be connected to a drive 134.

The steel plate cover 122 may be used to cover the bull wheel 120 so that ore or other materials 20 may be loaded directly on top of the bull wheel 120. This would allow the ore or other materials 20 to be accelerated to near the conveyor belt speed before it comes into contact with the conveyor belt 18. Further, the steel plate cover 122 helps prevent the clumping of particles deposited upon the bull wheel 120. Specifically, because of centrifugal force, the particles 20 deposited upon the steel plate cover 22 disperse to the outward ends of the steel plate cover, tending to even out the flow of particles 20.

The steel plate cover 122 should be larger than the first cylindrical member 124 to ensure that ore or other materials 20 deposited upon the steel plate cover 122 do not interfere with the operation of the bull wheel 120. Preferably, the first cylindrical member 124 and the third cylindrical member 128 are similar in dimension. Further, preferably, the second cylindrical member 126 is smaller than the first 124 and third 128 cylindrical members and of a thickness to ensure that the cable 12 properly fits in the c-shaped cross sectional opening formed. Each of the cylindrical members 124, 126, and 128 as well as the steel plate cover 122 may be welded together. Preferably the bull wheel is six feet in diameter although it may range, for example, from approximately four-and-a-half to approximately seven-and-a-half inches in diameter.

Referring also to FIGS. 11 and 12, there is shown a shroud 136. The shroud 136 helps to ensure that particles 20 do not spill off of the bull wheel 120. The shroud 136 may be placed around the bull wheel 120. The shroud 136 helps to serve as a dust collector (i.e., it prevents dust particles from spreading). The shroud 136 is stationary and preferably has an opening 138 which acts as a chute to allow the particles 20 to fall only the conveyor belt 18. Preferably, the opening is approximately 90 degrees. The particles 20 are channeled from the top of the steel plate cover 122 where the particles 20 may be deposited onto the system 10 to the outer ends of steel plate cover 122 and then the particles fall from the opening 138 onto the conveyor belt 18, the conveyor belt 18 being in tangential relation to the bull wheel 120.

The shroud 136 is preferably formed of one quarter inch sheet steel and is made with a twenty four inch troughed channel wrapping around the bull wheel 120 (i.e., the cross section of the shroud 136 is concave in shape). The shroud 136 is large enough to completely surround the bull wheel 120. The shroud 136 is preferably stationary and may be secured to the framework supporting the bull wheel 120. The shroud 136 may for example be formed in two sections and bolted together as well as to the framework supporting the bull wheel 120. The shroud 136 may, for example, have a diameter which is one foot larger than the diameter of the bull wheel 120 allowing for enough room for the particles to fall onto the conveyor belt 18. The bottom of the shroud 136 may, for example, be disposed above the plane of the cable 12 for approximately 180 degrees around the bull wheel 120 but may be disposed below the plane of the cable before the ore dumps on the conveyor belt 18. The shroud may, for example, be approximately one foot below the plane of the cable 12 where the ore dumps onto the conveyor belt 18. The shroud 136 may be placed upon both the driving bull wheel 120 or the driven bull wheel 121. A polyurethane ring 140 may also be disposed below the steel plate cover 122 to help prevent smaller particles from interfering with the bull wheel 120. The polyurethane ring 140 is secured to the bottom of the steel plate cover 122 and is concentric with the wheel. The polyurethane ring 140 is of such a dimension as to prevent small particles from dropping from the shroud 136 onto the ground yet permit the bull wheel 120 to rotate without undue friction caused by the polyurethane ring 140 being in communication with the shroud 136.

Referring to FIGS. 1 and 11, a drive 134 drives the bull wheel 120 and the steel plate cover 122 via the shaft 132. As a result, the bull wheel 120 moves in the direction of arrow A. The shaft may be, for example, a hollow shaft having a diameter of four to eight inches. There may be a drive 134 for more than one bull wheel 120 for a given cable driven conveyor system 10 (i.e., there is a bull wheel 120 which is separately driven at each end of the cable driven conveyor system 10). The drive 134 may be a drive used for chair lifts in the skiing industry, such as a Poma lift drive manufactured by the Poma Corporation of Junction, Colo.

Referring now to FIG. 10, there is shown an alternate embodiment of the steel plate cover 122'. In this embodiment, the steel plate cover 122' is dome-shaped in order to help disperse the particles 20 onto the conveyor belt 18. Where a six foot diameter bull wheel is employed, the center of the steel plate cover 122' would rise two feet from the rim of the steel plate cover 122'. A segmented cone may, for example, be used to form the steel plate cover 122'.

Spoked flanges or paddles may also be welded onto the dome-shaped steel plate cover 122'. The paddles 140 assist in accelerating the particles 20 to the rotational speed of the bull wheel 120. Preferably, the paddles 140 are configured such that they do not interfere with the shroud 136 shown in FIG. 11. The paddles may, for example, be four inches high and may extend from the shaft up until six inches from the edge of the steel plate cover 122'. Preferably, the sides of the paddles 140 facing the shroud 136 are tapered so that the paddles 140 do not interfere with the shroud 136.

Instead of loading the particles 20 directly onto the steel plate cover of the bull wheel 122, the particles may be loaded onto the conveyor belt 18 by use of a hopper 142 as shown in FIG. 1. Preferably, the hopper 142 is disposed above the conveyor belt 18 along an area of the cable driven conveyor system 10 where the conveyor belt is generally horizontal and the chute of the hopper 142 is directed such that the ore is deposited from the side into the opening 21, as shown in FIG. 2.

Referring now to FIGS. 1 and 13, there is shown an idler roll 144. Preferably the idler roll 144 may be an automobile or truck tire. The idler roll 144 may be supported upon stand 146. The idler roll 144 and stand 146 may be mounted on an actuated arm to enable several dump points along the conveyor belt 18 line. The idler roll 144 could also be mounted onto a stand 146 disposed upon a track, allowing dumping to occur anywhere along the conveyor belt 18 line. This feature may be desirable when stockpiling material such as ore. As a result, ore would remain on the ground along the path of the conveyor. The idler roll 144 would be continually moved to different locations along the conveyor belt 18 line for stockpiling along the conveyor belt 18 line.

Preferably, the idler roll 144 extends via opening 21 and engages the top part of the conveyor belt 18. As a result, the particles 20 may be dumped from the conveyor belt 18. Alternatively, the idler roll may comprise a plurality of tires aligned in tandem, each of which engages the top part of the conveyor belt 18 for dumping particles 20 from the conveyor belt 18. Further, a chain, not shown, may be disposed around the idler roll 144 in a fashion similar to chains used upon automobile tires to help cause vibration in the conveyor belt 18. The vibration in the conveyor belt 18 may help shake off excess particles 20 from the conveyor belt 18.

Referring also to FIG. 14, one or more scrapers 148 may be secured to the stand 146. Commercial scrapers may be configured to match the shape of the portion of the hanger 16 upon which the conveyor belt 18 rests. The scrappers 148 may be made, for example, from UHMW rubber, polyurethane, or metal blades. The scrapers 148 scrape off excess particles 20 which may remain upon the conveyor belt 18. The scrapers 148 also help to rotate the conveyor belt 18 about the cable 12 to allow the dumping of material.

Referring now to FIGS. 15A and 15B, there is shown a sectional end view of a hanger 16 positioned about the bull wheel 120 in its stationary position and in its running position, respectively. Specifically, the chain 62 goes from a vertical position when the hanger is stationary (i.e., the bull wheel 120 is not turning) to a somewhat horizontal position when the hanger is moving (i.e., the bull wheel 120 is turning). If the bull wheel 120 is activated, particles 20 may fling out of the hanger 16. A similar problem may occur when the bull wheel 120 is stopped.

To help prevent such a movement of the hanger 16, a large wheel or side rail 150 may be disposed below the bull wheel 120 as shown in FIG. 16. The large wheel 150 may be secured to the shaft 132 and may rotate with the bull wheel 120. As a result, the chain 62 will be prevented from moving into the horizontal position illustrated in FIG. 15B. Alternatively, a series a smaller wheels 152 may, for example, be secured to the ground. These smaller wheels would be placed in a ring-shape below the bull wheel 120 to similarly prevent the chain 62 from moving into a horizontal position. Further, a bell flange 154 may be secured to the bottom of the bull wheel 120 to similarly limit the position of the hanger 16 as shown in FIG. 17. The side rail 150 or bell flange 154 may have a diameter similar to that of the bull wheel 120.

Referring now to FIGS. 18A and 18B, there is shown a sectional end view of an alternate embodiment of a hanger 16 further including a flap 156. The flap 156 may be secured to the hanger via a flap hinge joint 158. Alternatively, the flap could be a continuation of the conveyor belt fabric that folds back onto itself. That is, the conveyor belt 18 is of a width which is approximately twice the size that would be needed to normally fit into hanger 16 such that half of the conveyor belt falls back on top of itself.

A roller wheel 145 may be used to catch upon extension 157 of the flap 156 for raising or lowering the flap 156. The roller wheel 145 may be disposed on a stand, not shown, similar to that which supports the idler roll 144. The flap 156 would be raised when the hanger 16 is near the opening or chute 138 shown in FIG. 11 or near the hopper 142 shown in FIGS. 1 and 18B. The flap 156 would also be opened just prior to the particles being dumped (i.e., just before reaching the idler roll 144). The flap 156 could be lowered just after these events take place.

Referring now to FIGS. 19A and 19B, there is shown a tensioning system used in conjunction with the bull wheel 120. The tensioning system 160 may comprise a mounting bracket 162 being generally rectangular in shape. One end of the mounting bracket 162 serves as a shaft for the bull wheel 120. The tensioning system 160 may further comprise a cable 166 connected to a counter weight 168, the cable 166 being disposed around a sheave wheel 170. The sheave wheel 170 may be either anchored to the roof or from underneath by a supporting framework. The opposing end of the cable may be secured to mounting bracket which, in turn, may adjust the relative position of the bull wheel 120. The counter weight 168 would thus keep the required tension in the driving cable 12. If, for example, four tons of tension are required for the driving cables 12, then the counterweight would preferably weigh approximately eight tons.

The tensioning system 160 may be similar to the tensioning systems found in ski lifts Specifically, the tensioning system may be a free floating bull wheel tensioning system as used on ski lifts The free floating bull wheel system may further include a standard trolley system used in ski lifts for supporting the roller wheel, adding further stability. Alternatively, the tensioning system 160 may comprise a constant tensioned winch, as is standard in the mining industry.

Referring also to FIGS. 20A and 20B, there is shown a transportable bull wheel assembly 171. The mounting bracket 162 is secured to a first beam 172 and a second beam 174. The first beam 172 is secured to third beams 176 and fourth beams 178 at each end of the first beam 172. The second beam 174 is connected to the bottom of mounting bracket 162. Each end of the second beam 174 is further connected to a fifth beam 180 which is, in turn, appropriately secured to beams 176 and 178. Wheels 182 may be secured to the lower ends of the beams 176 and 178 resulting in a transportable assembly 171. Alternatively, skids may be secured to the lower ends of the beams 176 and 178.

The beams may be six inch wide flange beams formed of standard structural steel. The beams may be bolted together so that the structure may be easily disassembled and moved. Alternatively, the beams may be secured by welding the beams to one another. Where a six foot diameter bull wheel 120 is employed, the transportable bull wheel assembly 171 may, for example, be ten feet wide by fifteen feet long in overall dimension.

The transportable bull wheel assembly 171 allows for compensation in the position of the bull wheel 120 because the transportable bull wheel assembly 171 cooperates with the tensioning system 160, moving the wheels 182 either forward or backward, depending upon the tension needed. As a result, the transportable bull wheel assembly 171 may be used in conjunction with a cable driven conveyor system 10 which is fixed in position. Further, because the transportable bull wheel assembly 171 may be easily transportable due to the fact that the assembly is disposed on wheels 182, should the conveyor path need to be changed, then the assembly may be moved for setting up the new conveyor site.

Referring now to FIGS. 21A and 21B, there is shown a continuous haulage assembly 190. The continuous haulage assembly 190 contains a shuttle car 192. The shuttle car 192 may be constructed on the framework of an existing piece of mining equipment, such as a 12CM9 drum miner manufactured by Joy Manufacturing Co. Alternatively, the shuttle car 192 may be constructed on the framework of a D-8 Caterpillar tractor. A drum miner, which is a mobile piece of mining equipment, is of a sufficient weight to provide traction to counter the tension in the cable 12 when the conveyor system 10 is in operation. The continuous haulage assembly 190 further contains a shaft 132 and bull wheel 120 mounted onto the shuttle car 192. The bull wheel 120 may be mounted at an angle from ten to thirty degrees below the horizontal. This may help prevent the cable from lifting off the idler rolls 193 should the terrain undulate. Because the deck of a drum miner 192 may be fifteen degrees from the horizontal, the bull wheel 120 may be placed in parallel to the deck.

A shroud 136, not shown, may be disposed about the bull wheel 120. The shroud be mounted to the shuttle car 192. Moreover, a drive 134 may be connected to the shuttle car 192. Preferably two pairs of idler rolls 193, one on each side of the shuttle car 192 may be fastened to the back side of the shuttle car 192 approximately ten feet from the bull wheel 120. The idler rolls may be, for example, six inch diameter wheels.

Although the continuous haulage assembly 190 was described as having a drive 134 and a bull wheel 120, the continuous haulage assembly 190 may contain a driven bull wheel 121. In such a setup, the cable driven conveyor system 10 would be driven at an opposite end.

In order to prevent the shuttle car 192 from moving, wheels 194 may be, for example, D-8 Caterpillar tractor wheels. Alternatively, the shuttle car 192 may be mounted onto a track 196, such as tracks standardly used in the mining industry. Wheel chocks 198 may be used to prevent the shuttle car 192 from moving. The track 196 may be laid down only in the region where the continuous haulage assembly 190 is to be placed. As a further alternative, the shuttle car could be tensioned by the use of hydraulic cylinders on the track 196 such that it does not slip.

If hydraulic cylinders are used, they could be configured to function in pairs of vertical cylinders with a horizontal cylinder in between each pair of vertical cylinders. One vertical cylinder would be mounted to the shuttle car 192 and the other mounted at the end of a horizontal cylinder.

The cycle would start by the horizontal cylinder first pushing out the collapsed vertical cylinder. The vertical cylinder would then be extended outward ahead of the shuttle car 192. The vertical cylinder on the car would then be collapsed. The horizontal cylinder would then pull the shuttle car 192 ahead. The vertical cylinder on the shuttle car 192 would then be extended to secure the car. Once the car is secured, the lead vertical cylinder could be collapsed and pushed ahead with the horizontal cylinder to start the cycle over again. These cylinders may be, for example, standard cylinders used in the mining industry.

The continuous haulage assembly 190 further includes a conveyor belt 200 mounted onto the shuttle car 192. The conveyor belt 200 may be a standard drag conveyor used in the mining industry. The conveyor belt 200 delivers the particles 20 to the bull wheel 120. Alternatively, a hopper, not shown, may deliver the particles 20 to the bull wheel 120.

A standard crusher 202 used in the mining industry may be provided prior to feeding the particles to the cable driven conveyor system. By utilizing a crusher 202, the particles 20 fed into the system would be smaller. This may result in less strain on the system. The crusher 202 would provide the crushed particles to a hopper 203, the hopper feeding the ore slightly off center of the conveyor belt 200 to allow room for a roof bolting machine and operator.

Referring also to FIG. 22, a continuous haulage system 211 comprises the continuous haulage assembly 190, including drive unit 134, at least one bull wheel 120, the conveyor belt 18, and a plurality of hangers 16. The continuous haulage system 211 may further comprise a hopper 142 or a shroud 136 for loading ore onto the conveyor belt 18. In addition, the continuous haulage system 211 may comprise a transportable bull wheel assembly 171. That is, the transportable bull wheel assembly 171 may be used in conjunction with the continuous haulage assembly 190.

When the transportable bull wheel assembly 171 is used in conjunction with the continuous haulage system 211, the transportable bull wheel assembly 171 does not stay in place. Rather, it is used as the tail end of the continuous haulage system 211. The continuous haulage assembly 190 pulls the transportable bull wheel assembly forward while maintaining the appropriate tension in the cable 12 by the use of the tensioning system or constant tension winch 160. That is, the shuttle car 120 will supply the tractive effort to move the continuous haulage system 190. As a result, the continuous haulage system 211 may stay behind the mining machine as it advances and retreats in the opposite direction when the miner is ready to move to another face.

When, however, the transportable bull wheel assembly 171 is used with a stationary system, its movement will be minimal, just enough to insure tension in the cable 12. That is, the bull wheel 120 on the transportable bull wheel assembly 171 must be free to move so that tension can always be maintained in the cable driven conveyor system. For example, the transportable bull wheel assembly 171 may move ten feet for a one hundred foot system 10. When the transportable bull wheel is used as part of the continuous haulage system, it may travel, for example, two hundred feet as well as maintaining the required tension in the cable.

Because both ends of the cable driven conveyor system 10 may be mobile as illustrated in FIGS. 20 and 21, the cable driven conveyor system is equipped for continuous haulage. That is, the position of the cable driven conveyor system 10 could easily be moved without adding any additional conveyor belt. The collection site would move the distance that the cable driven conveyor system 10 would move.

When the path of the cable driven conveyor system 10 is shifted, additional idler assemblies 14 should be placed in the vicinity of the shuttle car 192. Further, as the opposite end is moved, idler assemblies is the vicinity of the opposite end must be taken down to allow the opposite end to move where desired. Preferably, the idler assemblies 14 should be placed approximately every fifty feet for locations on the cable driven conveyor system 10 carrying particles 20. The idler assemblies may be placed approximately every seventy five to one hundred feet for locations on the cable driven conveyor system not carrying particles 20.

FIG. 22 shows an example of how the cable driven conveyor system 10 of the present invention may be used. The cable driven conveyor system is placed in a pathway 212 of a mine 210. A miner 214, for example, may be cutting rock, ore, or other minerals. The particles mined may be placed onto the continuous haulage assembly 190. A transportable bull wheel assembly 171 is also shown at the end of the cable driven conveyor system 10. Further, two intermediate bull wheels 123 are also shown for turning the conveyor belt 18 about the pathway 212. These bull wheels 123 are only wrapped with the cable 12 for approximately ninety degrees of the bull wheel's circumference when changing the conveyor belt 18 path around a corner which is approximately ninety degrees. As a result, the intermediate bull wheels 123 allow the conveyor belt to move in more than one direction. The cable driven conveyor system may transport particles 20 in the direction of arrow B.

The intermediate bull wheels 123 may be, for example, three feet in diameter. The intermediate bull wheels 123 would be similar in construction but merely smaller in diameter than the driving bull wheel 120 or driven bull wheel 121. However, if smaller sized intermediate bull wheels 123 were used, such as one or two foot diameter wheels, then more than one intermediate bull wheels 23 may be aligned in tandem to allow for the change in direction of the conveyor path, the change in direction preferably being split evenly between the intermediate bull wheels employed. For example, if the conveyor path were to turn a ninety degree corner, then two smaller intermediate bull wheels may be used, each changing the direction of the conveyor path by forty five degrees. Further, the bull wheels 123 may be wrapped with the cable 12 for more than ninety degrees for a sharper turn in the conveyor belt 18 path and less than ninety degrees for a slighter bend in the conveyor belt 18 path.

A idler roll 144 may be used to dump the ore mined onto a standard stub or short belt 216. The belt 216 should be of such a width as to ensure that the ore dumped from the cable driven conveyor system 10 gets placed onto the belt 216. The stub belt 216 may then dump the ore onto a standard conveyor system 218, such as a conveyor system manufactured by FMC Corporation or Continental Conveyor Corporation. As the miner 214 progresses in the direction of arrow C, the continuous haulage assembly 190 and the transportable bull wheel assembly 171 may be moved an appropriate distance in the direction of arrows C and D, respectively.

Instead of using a stub belt 216, the cable driven conveyor system 10 may contain a leg 220 in the region of the stub belt as shown in FIG. 23, having additional intermediate bull wheels 123 to direct the cable driven conveyor system 10 into the leg 220 and a bull wheel 120 to direct the cable driven conveyor into that pathway 212. The leg 220 would preferably extend beyond a standard feeder 217 and conveyor system 218. The feeder 217 is located at the conventional belt tail or end of the conveyor system 218 and sits on the ground. An idler roll 144 may allow the dumping of particles onto the feeder 217. Preferably, the dumping of the particles onto the feeder 217 occurs before the particles travel around the driven bull wheel 121.

The feeder 217 may be a crusher feeder manufactured by the Slamler Corporation. The feeder serves to crush the ore or particles and controls the feed rate so that the conveyor system 218 is not overloaded. The feeder should be positioned at a level so as not to interfere with the operation of the cable driven conveyor system 10. For example, a standard feeder 217 may be four feet high and the lowest point of the cable driven conveyor system 10 may be eight feet high. As a result, the feeder 217 may easily clear the path of the cable driven conveyor system 10. The setup shown in FIG. 23 may further lessen the amount of transfer points.

Because there may be less transfer points utilizing the principles of the present invention due to the fact that the driving force for the cable driven conveyor system 10 is in the cable 12, less dust may be created. Further, the cable driven conveyor system 10 can operate at different heights. Because the cable driven conveyor system 10 is bolted to the roof 42 via bolts 44, the pathway 212 may be at an incline or decline. For example, particles may be conveyed at an incline or decline of twenty degrees without the use of the flap 156 and may be conveyed at an incline or decline of up to forty five degrees with the use of the flap 156.

The conveyor system of the present invention is capable of operating at higher speeds. For example, the conveyor system may operate to speeds as high as 2,500 feet-per-minute but would preferably operate at speeds of approximately 1000 feet-per-minute. Further, because the system is driven via the cable 12, there may be less tension in the conveyor belt 18 as compared with the tension of the conveyor belts in standard conveyor systems used in the mining industry. As a result, the cable driven conveyor system 10 may be, for example, ten miles in length.

The conveyor system of the present invention may use less moving parts than typical conveyor systems. As a result, the conveyor system of the present invention may require less maintenance, may provide better reliability, and may use less power to operate.

It should be recognized that, while the present invention has been described in relation to the preferred embodiments thereof, those skilled in the art may develop a wide variation of structural details without departing from the principles of the invention. Therefore, the appended claims are to be construed to cover all equivalents falling within the true scope and spirit of the invention.

What is claimed is:

1. A conveyor system for transporting material comprising:

a cable;

at least one hanger connected to said cable;

a conveyor belt disposed on said hanger;

an idler assembly, said idler assembly comprising an idler bracket having a first side and a second side and an angle between said first and second side, said idler bracket forming a v-shape, said idler assembly further comprising a first idler wheel connected to said first side of said idler bracket and a second idler wheel connected to said second side of said idler bracket, said first and second idler wheels forming a pair of idler wheels and being arranged in an angular relation forming a cradling region; and at least one support mounted on the underside of said conveyor belt;

wherein said cradling region supports said cable and wherein said first idler wheel is generally parallel to said first side of said idler bracket and said second idler wheel is generally parallel to said second side of said idler bracket and wherein said conveyor system comprises a plurality of said hangers and a plurality of said supports, said hangers being disposed in a region approximately half way between adjacent supports.

2. A conveyor system for transporting material comprising:

a cable;

at least one hanger connected to said cable;

a conveyor belt disposed on said hanger;

an idler assembly, said idler assembly comprising an idler bracket having a first side and a second side and an angle between said first and second side, said idler bracket forming a v-shape, said idler assembly further comprising a first idler wheel connected to said first side of said idler bracket and a second idler wheel connected to said second side of said idler bracket, said first and second idler wheels forming a pair of idler wheels and being arranged in an angular relation forming a cradling region;

a cable connecting assembly for connecting said cable to said hanger; and a chain disposed between said hanger and said cable connecting assembly wherein said cable connecting assembly comprises a spring steel strap and a bracket, said spring steel strap being fastened to one end of said bracket, and an opposing end of said spring steel strap being connected to said chain, said spring steel strap being wrapped around said cable and wherein said cradling region supports said cable and wherein said first idler wheel is generally parallel to said first side of said idler bracket and said second idler wheel is generally parallel to said second side of said idler bracket.

3. A conveyor system for transporting material comprising:

a cable;

at least one hanger connected to said cable;

a conveyor belt disposed on said hanger; and at least one support mounted on the underside of said conveyor belt;

wherein said conveyor system comprises a plurality of said hangers and a plurality of said supports, said hangers being disposed in a region approximately half way between adjacent supports.

4. A conveyor system for transporting material comprising:

a cable;

at least one hanger connected to said cable;

a conveyor belt disposed on said hanger;

a cable connecting assembly for connecting said cable to said hanger; and a chain disposed between said hanger and said cable connecting assembly;

wherein said cable connecting assembly comprises a spring steel strap and a bracket, said spring steel strap being fastened to one end of said bracket, and an opposing end of said spring steel strap being connected to said chain, said spring steel strap being wrapped around said cable.

5. A conveyor system for transporting material comprising:

a cable;

a plurality of hangers operatively connected to said cable;

a conveyor belt disposed on said plurality of hangers;

a plurality of idler assemblies, said idler assemblies supporting said cable; and at least one bull wheel having a notch, said notch receiving said cable; and a steel plate cover disposed on said bull wheel allowing said material to be placed onto said steel plate cover;

wherein said conveyor is capable of transporting said material in more than one direction.

6. The invention of claim 5 further comprising a shroud disposed around said bull wheel and having an opening to allow particles deposited onto said steel plate cover to be provided to said conveyor belt.

7. The invention of claim 5 wherein said steel plate cover is domed-shaped and has a plurality of paddles disposed thereon.

8. A conveyor system for transporting material comprising:

a cable;

a plurality of hangers operatively connected to said cable;

a conveyor belt disposed on said plurality of hangers;

a plurality of idler assemblies, said idler assemblies supporting said cable;

at least one bull wheel having a notch, said notch receiving said cable; and one of a side rail, bell flange and a wheel disposed below said bull wheel;

wherein said conveyor is capable of transporting said material in more than one direction.

9. A conveyor system for transporting material comprising:

a cable;

a plurality of hangers operatively connected to said cable;

a conveyor belt disposed on said plurality of hangers;

a plurality of idler assemblies, said idler assemblies supporting said cable;

at least one bull wheel having a notch, said notch receiving said cable; and a transportable bull wheel assembly, said transportable bull wheel comprising a mounting bracket, one side of said mounting bracket forming a shaft for said bull wheel, said transportable bull wheel assembly further comprising a plurality of wheels for allowing said assembly to be movable;

wherein said conveyor is capable of transporting said material in more than one direction.

10. A conveyor system for transporting material comprising:

a cable;

a plurality of hangers operatively connected to said cable;

a conveyor belt disposed on said plurality of hangers;

a plurality of idler assemblies, said idler assemblies supposing said cable, each of said idler assemblies comprising an idler bracket having a first side and a second side and an angle between said first and second side, said idler bracket forming a v-shape, said idler assembly further comprising a first idler wheel connected to said first side of said idler bracket and a second idler wheel connected to said second side of said idler bracket, said first and second idler wheels forming a pair of idler wheels and being arranged in an angular relation forming a cradling region; and at least one bull wheel having a notch, said notch receiving said cable;

wherein said cradling region supports said cable, said first idler wheel is generally parallel to said first side of said idler bracket and said second idler wheel is generally parallel to said second side of said idler bracket, and said conveyor is capable of transporting said material in more than one direction.

11. The invention of claim 10 further comprising a steel plate cover disposed on said bull wheel allowing said material to be placed onto said steel plate cover.

12. The invention of claim 11 further comprising a shroud disposed around said bull wheel and having an opening to allow particles deposited onto said steel plate cover to be provided to said conveyor belt.

13. The invention of claim 11 wherein said steel plate cover is domed-shaped and has a plurality of paddles disposed thereon.

14. The invention of claim 10 further comprising a hopper for placing said material onto said conveyor belt.

15. The invention of claim 10 further comprising an idler roll for engaging a top part of said conveyor belt for dumping said material from said conveyor belt.

16. The invention of claim 10 further comprising a scraper for scraping excess material from said conveyor belt.

17. The invention of claim 10 further comprising one of a side rail, bell flange and a wheel disposed below said bull wheel.

18. The invention of claim 10 further comprising a transportable bull wheel assembly, said transportable bull wheel comprising a mounting bracket, one side of said mounting bracket forming a shaft for said bull wheel, said transportable bull wheel assembly further comprising a plurality of wheels for allowing said assembly to be movable.

19. The invention of claim 10 further comprising a continuous haulage assembly, said continuous haulage assembly comprising a bull wheel disposed on a shuttle car, said continuous haulage assembly being movable.

20. The invention of claim 10 further comprising a tensioning system for providing tension to said cable, said tensioning system comprising one of a constant tensioned winch and a counterweight.

21. A continuous haulage system for transporting material comprising:

a cable;

a plurality of hangers operatively connected to said cable;

a conveyor belt disposed on said plurality of hangers;

a plurality of idler assemblies, said idler assemblies supporting said cable; and a continuous haulage assembly, said continuous haulage assembly comprising a bull wheel disposed on a shuttle car, said bull wheel having a notch for receiving said cable, said continuous haulage assembly being movable.

22. The invention of claim 21 further comprising a transportable bull wheel assembly, said transportable bull wheel comprising a mounting bracket, one side of said mounting bracket forming a shaft for a second bull wheel.

23. The invention of claim 21 wherein said conveyor belt is capable of transporting said material in more than one direction.

24. The invention of claim 21 further comprising an intermediate bull wheel for moving said conveyor belt in more than one direction.

25. The invention of claim 24 wherein said intermediate bull wheel changes a path in said conveyor belt by approximately ninety degrees.

26. A conveyor system for transporting material comprising:

a cable;

a plurality of hangers operatively connected to said cable;

a conveyor belt disposed on said plurality of hangers;

a plurality of idler assemblies, said idler assemblies supporting said cable;

at least one bull wheel having a notch, said notch receiving said cable; and a continuous haulage assembly, said continuous haulage assembly comprising a bull wheel disposed on a shuttle car, said continuous haulage assembly being movable;

wherein said conveyor is capable of transporting said material in more than one direction.

* * * * *